United States Patent
Jung et al.

(10) Patent No.: US 11,210,056 B2
(45) Date of Patent: Dec. 28, 2021

(54) ELECTRONIC DEVICE AND METHOD OF CONTROLLING THEREOF

(71) Applicant: SAMSUNG ELECTRONICS CO., LTD., Suwon-si (KR)

(72) Inventors: Chanyong Jung, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/856,303

(22) Filed: Apr. 23, 2020

(65) Prior Publication Data

US 2020/0341720 A1    Oct. 29, 2020

(30) Foreign Application Priority Data

Apr. 25, 2019    (KR) .................. 10-2019-0048454

(51) Int. Cl.
*G06F 3/048* (2013.01)
*G06F 3/16* (2006.01)

(52) U.S. Cl.
CPC .................. *G06F 3/165* (2013.01)

(58) Field of Classification Search
CPC ....................................... G06F 3/165
See application file for complete search history.

(56) References Cited

U.S. PATENT DOCUMENTS

| | | | |
|---|---|---|---|
| 8,850,317 B2 | 9/2014 | Chaudhri | |
| 9,395,871 B2 | 7/2016 | Marra et al. | |
| 9,733,897 B2 | 8/2017 | Lee | |
| 10,031,659 B2 | 7/2018 | Chun | |
| 10,455,073 B2 | 10/2019 | Lee et al. | |
| 10,481,856 B2 | 11/2019 | Sadak et al. | |
| 2009/0106657 A1 | 4/2009 | Chaudhri | |
| 2010/0286145 A1 | 11/2010 | Ghosh et al. | |
| 2013/0287215 A1* | 10/2013 | Kim ................. | H03G 3/02 381/57 |
| 2015/0052466 A1 | 2/2015 | Chun | |
| 2015/0253936 A1 | 9/2015 | Marra et al. | |
| 2016/0004408 A1* | 1/2016 | Yun .................. | G06F 3/04883 345/173 |
| 2016/0098246 A1 | 4/2016 | Lee | |

(Continued)

FOREIGN PATENT DOCUMENTS

| | | |
|---|---|---|
| KR | 10-2004-0042031 | 5/2004 |
| KR | 10-2017-0088675 | 8/2017 |
| KR | 10-2018-0106231 | 10/2018 |

OTHER PUBLICATIONS

International Search Report dated Aug. 14, 2020 in corresponding International Application No. PCT/KR2020/005278.

*Primary Examiner* — Claudia Dragoescu
(74) *Attorney, Agent, or Firm* — Nixon & Vanderhye P.C.

(57) ABSTRACT

Disclosed is an electronic device. A disclosed method for controlling an electronic device may include: generating a dedicated audio output descriptor and a dedicated audio output thread corresponding to an application in response to a preset event associated with the application, applying an audio setting value stored in the dedicated audio output descriptor to audio data associated with the application using the dedicated audio output thread, and mixing and outputting the audio data output using the dedicated audio output thread with audio data output from another audio output thread.

10 Claims, 17 Drawing Sheets

(56) References Cited

U.S. PATENT DOCUMENTS

| | | | |
|---|---|---|---|
| 2016/0255398 A1* | 9/2016 | Lee ........................... | G06F 3/16 348/462 |
| 2017/0192746 A1* | 7/2017 | Jeong .................. | G06F 3/04847 |
| 2018/0267773 A1 | 9/2018 | Kim et al. | |
| 2018/0329672 A1 | 11/2018 | Sadak et al. | |

* cited by examiner

| OUTPUT PATH | PRIORITY | VOLUME VALUE |
|---|---|---|
| EARPHONE | 1 | 10 |
| BLUETOOTH | 2 | 15 |
| SPEAKER | 3 | 10 |

710

| OUTPUT PATH | VOLUME VALUE |
|---|---|
| EARPHONE | 4 |
| BLUETOOTH | 8 |
| SPEAKER | 12 |

ELECTRONIC DEVICE AND METHOD OF CONTROLLING THEREOF

CROSS-REFERENCE TO RELATED APPLICATION

This application is based on and claims priority under 35 U.S.C. § 119 to Korean Patent Application No. 10-2019-0048454, filed on Apr. 25, 2019, in the Korean Intellectual Property Office, the disclosure of which is incorporated by reference herein its entirety.

BACKGROUND

1. Field

The disclosure relates to an electronic device and a controlling method thereof, and for example, relates to an electronic device that provides a function of outputting different pieces of audio data corresponding to applications.

2. Description of Related Art

An electronic device may execute various applications that output audio data. For example, the electronic device may output music by executing a music application. The electronic device may execute a navigation application to output a voice or a sound effect associated with directions.

An electronic device may simultaneously execute a plurality of applications that output audio data. For example, while outputting music through a music application, the electronic device may simultaneously execute a navigation application to output a voice or a sound effect associated with directions. In this case, a user requests that the electronic device distinguishes two pieces of audio data from two applications by outputting the music output from the music application and the voice or sound effect output from the navigation application with the same audio output path and the same volume value. However, the request of the user may not be satisfied.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below.

In accordance with an example aspect of the disclosure, a method for controlling an electronic device may include: generating a dedicated audio output descriptor and a dedicated audio output thread corresponding to an application in response to a preset event associated with the application, applying an audio setting value stored in the dedicated audio output descriptor to audio data associated with the application using the dedicated audio output thread, and mixing and outputting the audio data output using the dedicated audio output thread with audio data output from another audio output thread.

In accordance with another example aspect of the disclosure, an electronic device may include: at least one or more processors and at least one or more memories. The memories store instructions that, when executed, cause the at least one or more processors to: generate a dedicated audio output descriptor corresponding to an application and a dedicated audio output thread corresponding to the application in response to a preset event associated with the application, apply an audio setting value stored in the dedicated audio output descriptor to audio data associated with the application using the dedicated audio output thread, and mix and output the audio data output using the dedicated audio output thread with audio data output from another audio output thread.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7A is a diagram illustrating an example of outputting audio data to an electronic device using an audio output descriptor corresponding to an application and an audio output descriptor of the electronic device, according to an embodiment;

DETAILED DESCRIPTION

The electronic device according to various example embodiments disclosed in the disclosure may be various types of devices. The electronic device may include, for example, and without limitation, a portable communication device (e.g., a smartphone), a computer device, a portable multimedia device, a mobile medical appliance, a camera, a wearable device, a home appliance, or the like. The electronic device according to an embodiment of the disclosure should not be limited to the above-mentioned devices.

Various embodiments of the disclosure and terms used herein are not intended to limit the technical features described in the disclosure to specific embodiments, and it should be understood that the embodiments and the terms include modifications, equivalents, or alternatives on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", a component is connectable to the other component, directly (e.g., by wire), wirelessly, or through the third component.

The term "module" used herein may include a unit, which is implemented with hardware, software, or firmware, or any combination thereof, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Hereinafter, various example embodiments of the disclosure may be described with reference to accompanying drawings.

Figure 1:
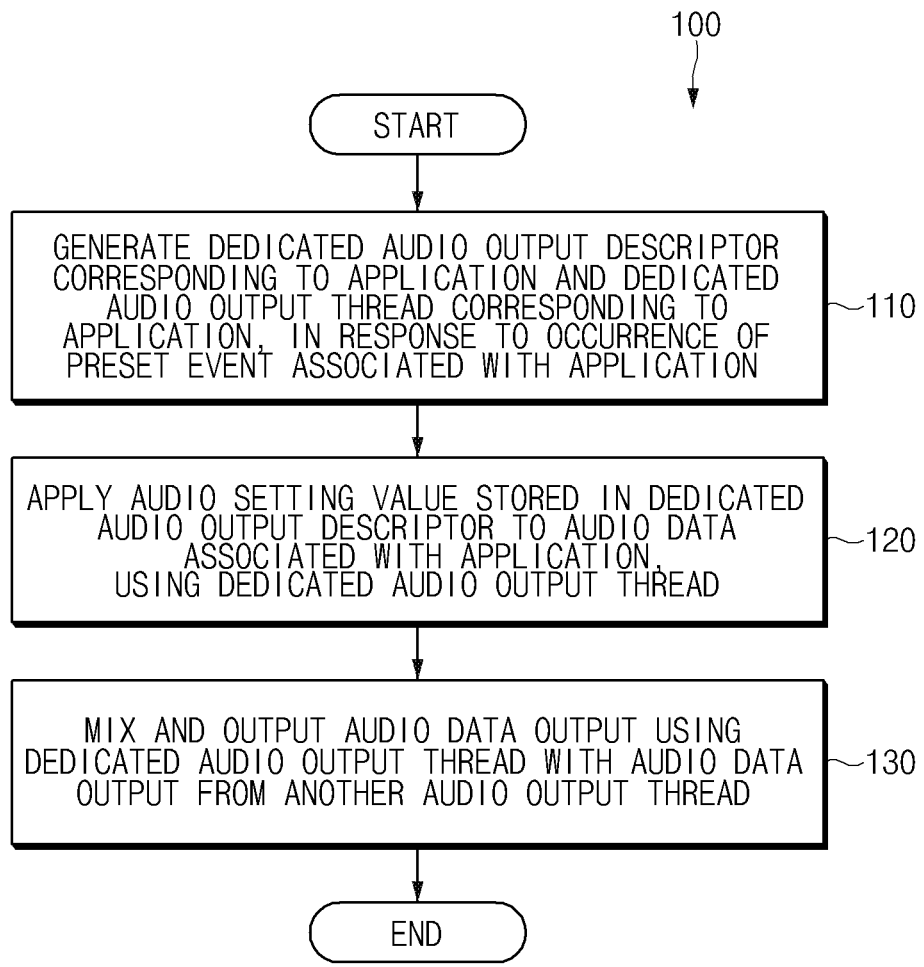
FIG. 1 is a flowchart illustrating an example in which an electronic device generates and applies an audio policy in association with an application, according to an embodiment.
Figure 2A:
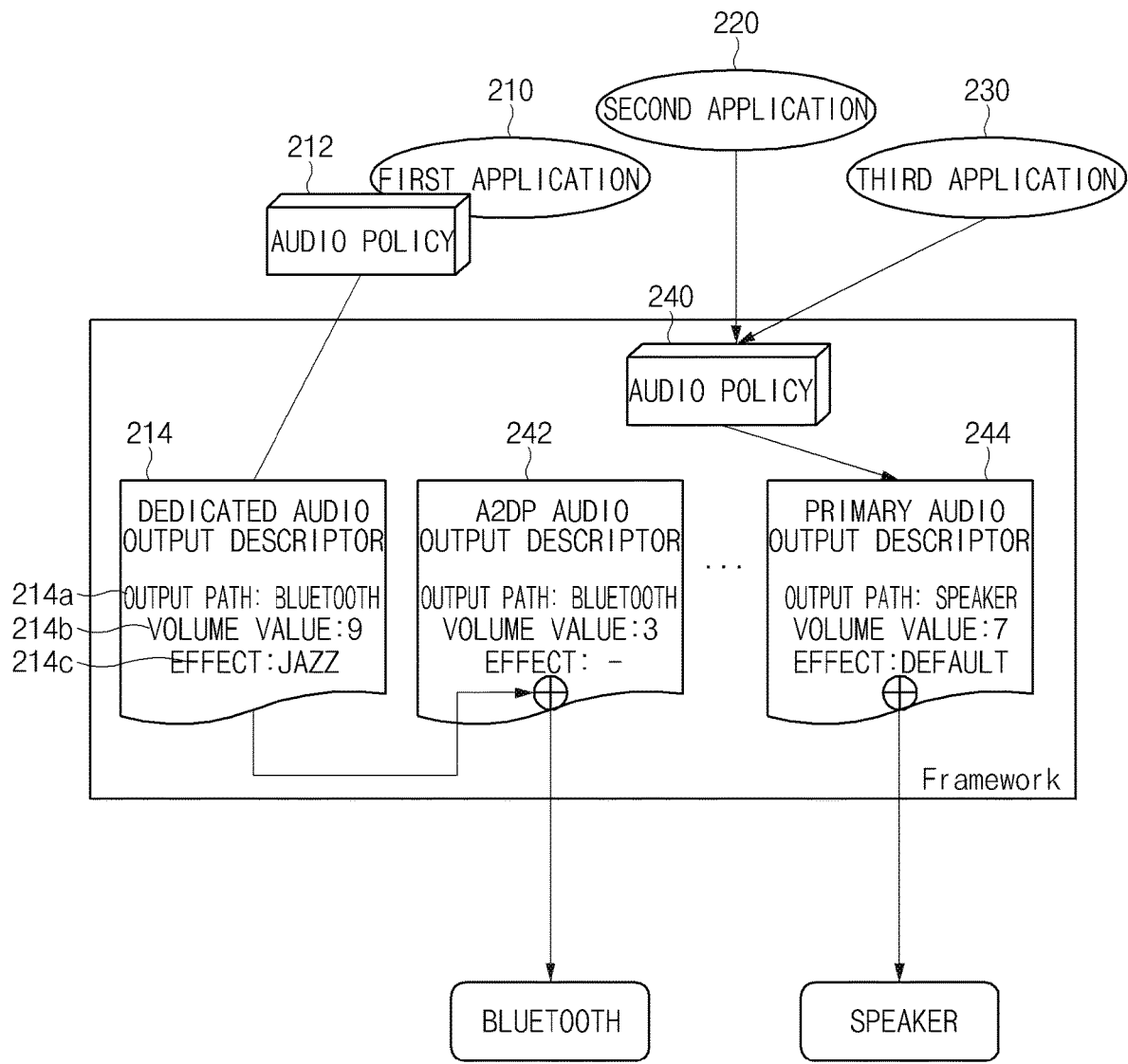
FIG. 2A a diagram illustrating an example in which an electronic device generates a dedicated audio output descriptor, according to an embodiment.
Figure 2B:
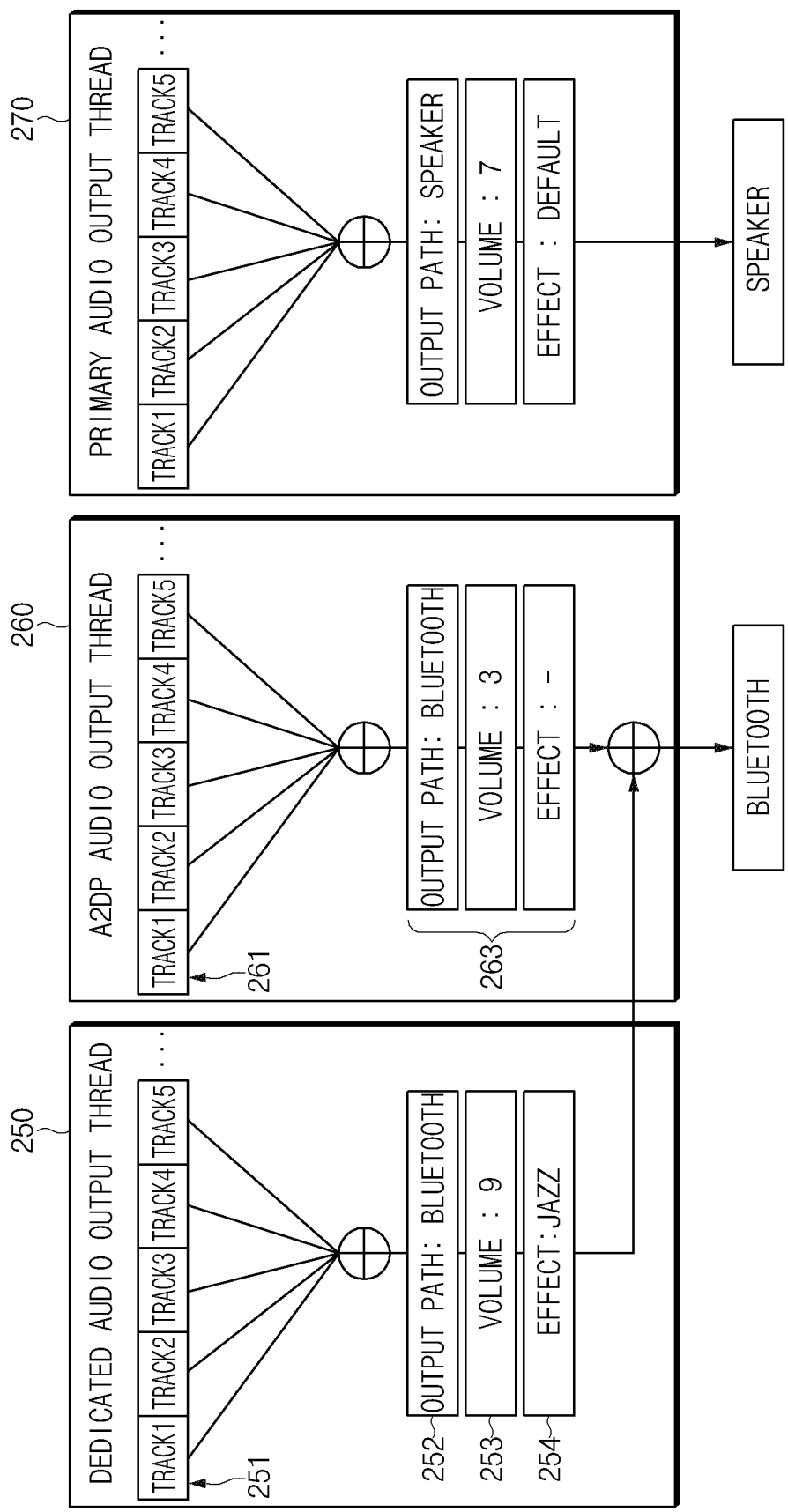
FIG. 2B is a diagram illustrating an example in which an electronic device generates a dedicated audio output thread, according to an embodiment.

FIG. 1 is a flowchart 100 illustrating an example in which an electronic device generates and applies an audio policy in association with an application, according to an embodiment. FIG. 2A a diagram illustrating an example in which an electronic device generates a dedicated audio output descriptor, according to an embodiment. FIG. 2B is a diagram illustrating an example in which an electronic device generates a dedicated audio output thread, according to an embodiment.

Hereinafter, each operation described in the flowchart may be sequentially performed, but is not necessarily sequentially performed. For example, the order of operations may be changed, and at least two operations may be performed in parallel.

Referring to FIG. 1, in operation 110, an electronic device 10 (e.g., illustrated in FIG. 6 and others) may generate a dedicated audio output descriptor corresponding to an application and a dedicated audio output thread corresponding to the application in response to the occurrence of a preset event associated with the application.

According to an embodiment, the electronic device 10 may include various applications provided by the manufacturer. For example, the application may include various application programs running on an operating system. For example, the application may include various types of application programs in each of which audio data such as, for example, and without limitation, a game, a phone, a text, a navigation, a music, an alarm, a schedule, a system setting, a web browser, an SNS, a camera, or the like is capable of being generated.

According to an embodiment, for example, the preset event associated with an application may refer, for example, to the electronic device 10 obtaining and installing the application from an external device to which communication is connected (e.g., downloading and installing the application from the external device). The preset event associated with an application may refer, for example, to the electronic device 10 executing the installed application for the first time. However, embodiments of the disclosure are not limited thereto.

According to an embodiment, when the electronic device 10 detects the occurrence of a preset event associated with an application, the electronic device 10 may generate a dedicated audio output descriptor corresponding to the application. For example, the dedicated audio output descriptor may include a set of data including an audio setting value for audio output.

According to an embodiment, the electronic device 10 may generate a dedicated audio output descriptor and may assign identification (ID) to the dedicated audio output descriptor to identify the corresponding application.

For example, the audio setting value for the audio output may include, for example, and without limitation, at least one of a volume value, an output path, a priority of the output path, an audio effect, or the like.

Referring to FIG. 2A, a first application 210 may include an audio policy 212. For example, when the audio policy 212 outputs audio data associated with the first application 210, the audio policy 212 may include an audio setting value to be applied to the audio data.

The electronic device 10 may obtain the audio policy 212 from the first application 210, may generate a dedicated audio output descriptor 214, may assign an identifier to the dedicated audio output descriptor 214, and may store the dedicated audio output descriptor 214 in a memory. In this example, the first application 210 may be an application in which the above-described preset event occurs.

According to an embodiment, the electronic device 10 may obtain audio setting values (e.g., an output path 214a set to Bluetooth, a volume value 214b set to 9 levels, or an audio effect 214c set, for example, to jazz) included in the audio policy 212 and may store the audio setting values in the dedicated audio output descriptor 214. In this example, the electronic device 10 may determine that an audio setting value not obtained from the first application 210 is in a state where there is no value; the electronic device 10 may determine that the audio setting value is a value preset by the electronic device 10.

According to an embodiment, the electronic device 10 may be in a state where at least one or more audio output descriptors 242 and 244 are stored in advance. The audio output descriptors 242 and 244 may be audio output descriptors corresponding to the basic audio policy 240 of the electronic device 10 set by the manufacturer of the electronic device 10. The basic audio policy 240 may be an audio policy including audio setting values set by the manufacturer of the electronic device 10.

For example, the electronic device 10 may store the at least one or more audio output descriptors 242 and 244 corresponding to an output path (alternatively, an output module or an output target device). For example, the electronic device 10 may store the A2DP audio output descriptor 242 corresponding to the output to Bluetooth and the primary audio output descriptor 244 corresponding to the output to a speaker. However, embodiments of the disclosure are not limited thereto. The electronic device 10 may further include an audio output descriptor corresponding to the output target device or the output path. For example, the electronic device 10 may further include, for example, and without limitation, an audio output descriptor corresponding to audio output using High Definition Multimedia Interface (HDMI), an audio output descriptor corresponding to audio output using wireless fidelity (Wi-Fi), or the like.

According to an embodiment, the electronic device 10 may apply at least one of the A2DP audio output descriptor 242 or the primary audio output descriptor 244 corresponding to the basic audio policy 240 to the audio data output in association with a second application 220 and a third application 230.

According to various embodiments, the audio setting value included in the dedicated audio output descriptor may include state information or function information of the electronic device 10. For example, the audio setting value may store a volume value, an output path, the priority of an output path, or an audio effect in response to a first state or a first function and may store a volume value, an output path, the priority of an output path, or an audio effect in response to a second state or a second state.

In this example, the electronic device 10 may apply volume values, output paths, priorities of output paths, or audio effects, which are different from one another, in response to the case where the electronic device 10 is in the first state or executes the first function and the case where the electronic device 10 is in the second state or executes the second function.

According to an embodiment, when the electronic device 10 detects the occurrence of a preset event associated with an application, the electronic device 10 may generate a dedicated audio output thread corresponding to the application. For example, the dedicated audio output thread may refer, for example, to a minimum algorithm (or software) unit capable of processing a single process for outputting audio data corresponding to an application.

Referring to FIG. 2B, the electronic device 10 may generate a dedicated audio output thread 250 corresponding to the first application 210 to store the dedicated audio output thread 250 in a memory. When outputting audio data associated with the first application 210, the electronic device 10 may output the audio data using the dedicated audio output thread 250. In this case, the electronic device 10 may utilize data stored in the dedicated audio output descriptor 214.

According to an embodiment, the electronic device 10 may be in a state in which at least one or more audio output threads 260 and 270 are stored in advance. The audio output threads 260 and 270 may be audio output threads corresponding to the basic audio policy 240 of the electronic device 10 set by the manufacturer of the electronic device 10. The basic audio policy 240 may be an audio policy including audio setting values set by the manufacturer of the electronic device 10.

For example, the electronic device 10 may store the at least one or more audio output threads 260 and 270 corresponding to an output path (alternatively, an output module or an output target. For example, the electronic device 10 may store the A2DP audio output thread 260 corresponding to the output to Bluetooth and the primary audio output thread 270 corresponding to the output to a speaker. When using the A2DP audio output thread 260, the electronic device 10 may use the audio setting value stored in the A2DP audio output descriptor 242. When using the primary audio output thread 270, the electronic device 10 may use the audio setting value stored in the primary audio output descriptor 244.

According to various embodiments, the electronic device 10 may further include an audio output thread corresponding to the output target device or the output path. For example, the electronic device 10 may further include an audio output thread corresponding to audio output using HDMI, an audio output thread corresponding to audio output using Wi-Fi, or the like.

Referring to FIG. 1, in operation 120, the electronic device 10 may apply an audio setting value stored in a dedicated audio output descriptor to audio data associated with an application using a dedicated audio output thread.

According to an embodiment, the electronic device 10 may be in a state where an audio setting value (e.g., an output path, a volume value, and an audio effect) included in the generated dedicated audio output thread 250 is not determined. The electronic device 10 may determine the audio setting value included in the dedicated audio output thread 250, using the audio setting value stored in the dedicated audio output descriptor 214.

Referring to FIG. 2B, the electronic device 10 may apply audio setting values (e.g., the output path 214a set to Bluetooth, the volume value 214b set to 9 levels, or the audio effect 214c set to jazz) included in the dedicated audio descriptor 214, to audio setting values (e.g., an output path 252, a volume value 253, or an audio effect 254) included in the dedicated audio output thread 250.

The electronic device 10 may set pieces of audio data output in association with the first application 210 to audio tracks 251 to which the audio setting values 252, 253, or 254 included in the dedicated audio output thread 250 are applied.

According to an embodiment, the electronic device 10 may generate and store a dedicated audio output descriptor in response to a single function included in an application.

The electronic device 10 may generate and store a dedicated audio output thread in response to the function of an application.

For example, in the case where the first application 210 is a music playing application, the electronic device 10 may set the dedicated audio output descriptor to be applied to the audio data only when playing the audio data stored in a specific folder. In the case where the first application 210 is a music playing application, the electronic device 10 may generate and store a dedicated audio output descriptor applied to audio data only when audio data is played through streaming and a dedicated audio output descriptor applied to audio data only when the downloaded audio data is played.

According to various embodiments, in the case where the first application 210 is a music playing application, the electronic device 10 may set output audio data to be output using a dedicated audio output thread only when audio data stored in a specific folder is played. In the case where the first application 210 is a music playing application, the electronic device 10 may generate and store a dedicated audio output thread used only when audio data is played through streaming and a dedicated audio output thread used only when the downloaded audio data is played.

According to an embodiment, the electronic device 10 may generate and store a dedicated audio output descriptor in response to the state of the electronic device 10. The electronic device 10 may generate and store a dedicated audio output thread in response to the state of the electronic device 10.

For example, when the first application 210 is a music playing application, the electronic device 10 may obtain location information of the electronic device 10 and may set the dedicated audio output descriptor to be applied to audio data when at home.

According to various embodiments, when the first application 210 may be a music playing application, the electronic device 10 may obtain location information of the electronic device 10 and may set the audio data to be output using the dedicated audio output thread only when at home.

According to various embodiments, at least one or more audio setting values stored in the dedicated audio output thread 250 may be adjusted. For example, when the electronic device 10 obtains a new value for the audio setting value from the first application 210, the at least one or more audio setting values stored in the dedicated audio output thread 250 may be adjusted. The electronic device 10 may provide a user with a method (e.g., a user interface provided to the display of the electronic device 10) capable of adjusting at least one or more audio setting values stored in the dedicated audio output thread 250.

Referring to FIG. 1, in operation 130, the electronic device 10 may mix and output audio data output using a dedicated audio output thread with audio data output from another audio output thread.

Referring to FIG. 2B, the electronic device 10 may output the audio data output in association with the second application 220 and the third application 230, using at least one of the A2DP audio output thread 260 or the primary audio output thread 270 corresponding to the basic audio policy 240.

According to an embodiment, the electronic device 10 may be connected to an external audio output device, using a Bluetooth communication method. The electronic device 10 may be in a state where the first application 210 and the second application 220 are running.

According to an embodiment, the electronic device 10 may set pieces of audio data output in association with the second application 220, to audio tracks 261 to which an audio setting value 263 included in the A2DP audio output thread 260 is applied.

According to an embodiment, the electronic device 10 may mix and output the audio data output using the dedicated audio output thread 250 generated in response to the first application with the audio data output using the pre-stored audio output threads 240 and 250, together.

According to various embodiments, when the execution of the first application 210 is terminated or when the first application 210 is deleted, the electronic device 10 may delete at least one of the dedicated audio output thread 250 or the dedicated audio output descriptor 214, which are generated in response to the first application 210.

According to various embodiments, the operation of generating a dedicated audio output descriptor may be omitted; when a preset event associated with an application occurs, the electronic device 10 may generate a dedicated audio output thread corresponding to the application and may obtain an audio setting value from the application to store the audio setting value in the dedicated audio output thread.

According to various embodiments, the above-described operations may be performed as the processor (e.g., the processor 320 of FIG. 3) of the electronic device 10 utilizes at least one or more programs (or functions, algorithms, or the like) stored in the framework 201 or at least one or more applications already installed. The above-described operations may be performed using the various programs (or, functions, algorithms, or the like) in each of which instructions included in the application are stored in the framework 201 of the electronic device 10.

As such, according to an embodiment of the disclosure, the electronic device 10 may simultaneously or sequentially output the audio data generated by a pre-stored audio output thread and the audio data generated by a newly generated dedicated audio output thread, through a single output path without the addition of hardware.

Figure 3:
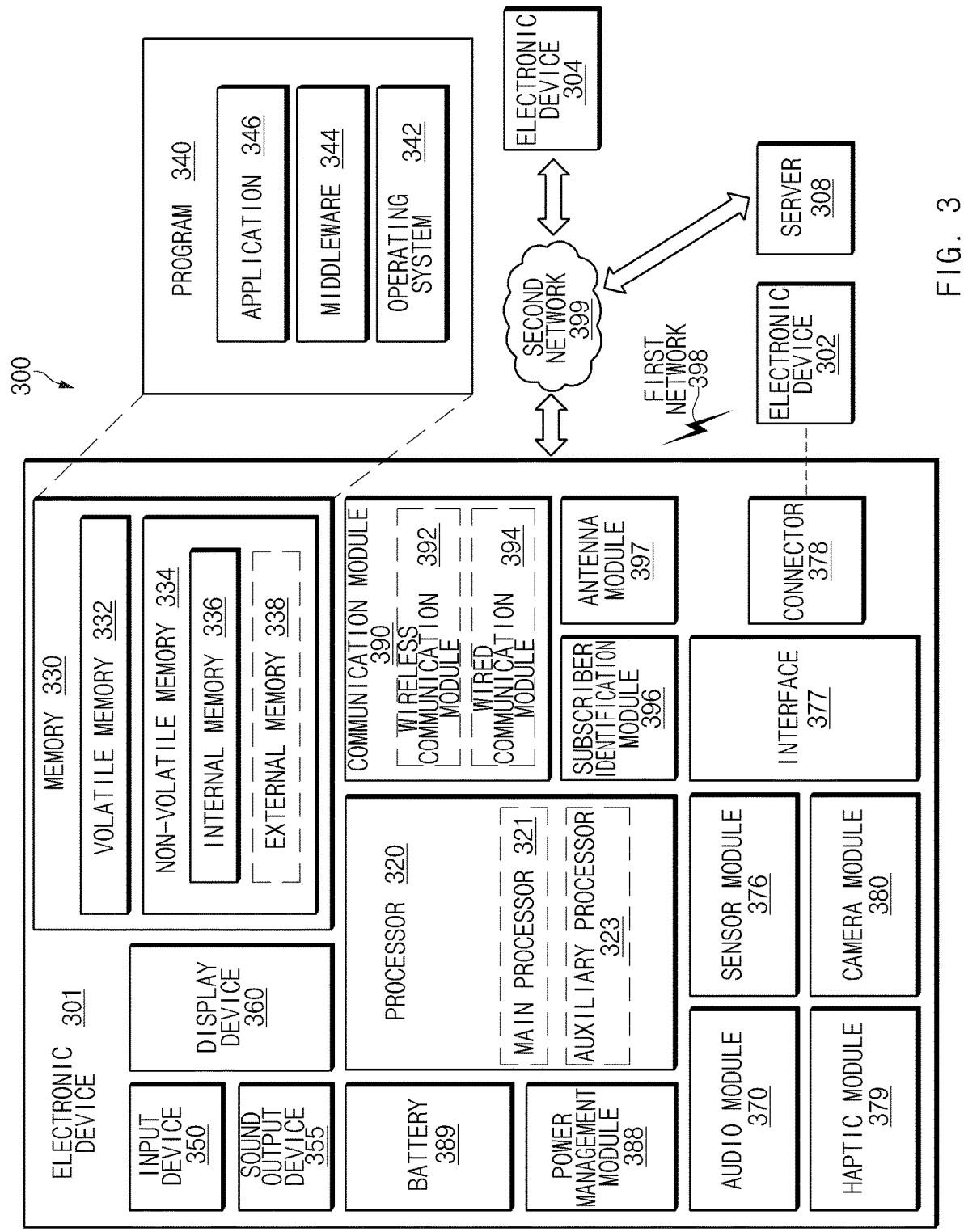
FIG. 3 is a block diagram illustrating an example electronic device in a network environment, according to various embodiments.

FIG. 3 is a block diagram illustrating an example electronic device 301 in a network environment 300 according to various embodiments. The electronic device 301 may comprise the electronic device 10 in FIG. 2.

Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to an example embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an example embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™ wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Figure 4:
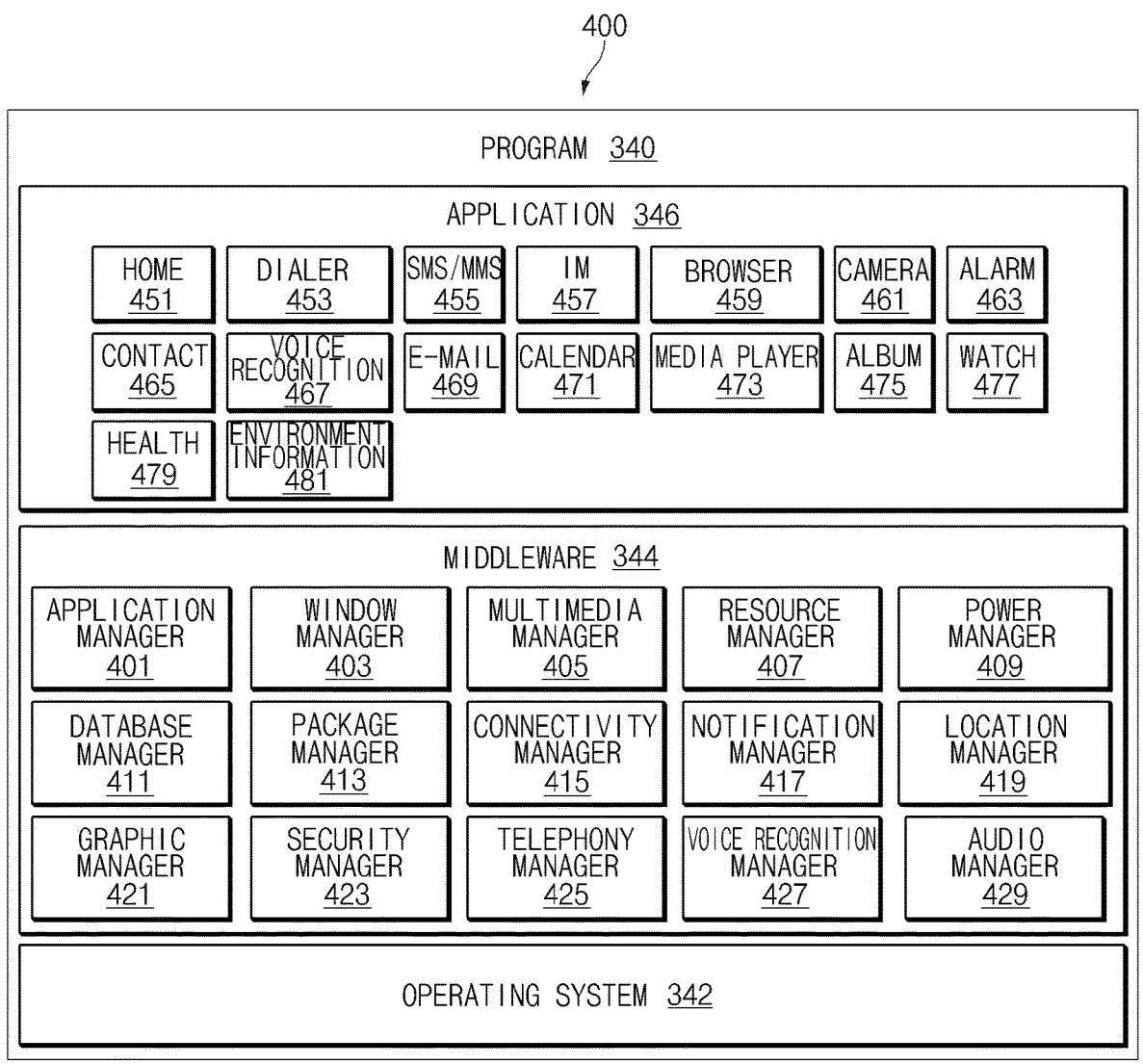
FIG. 4 is a block diagram illustrating an example program according to various embodiments.

FIG. 4 is a block diagram 400 illustrating an example program 340 according to various embodiments.

According to an embodiment, the program 340 may include the operating system 342 for controlling one or more resources of the electronic device 301, the middleware 344, or the application 346 executable in the operating system 342. For example, the OS 342 may include Android™, iOS™, Windows™, Symbian™, Tizen™, or Bada™. For example, at least a part of the program 340 may be preloaded on the electronic device 301 when the electronic device 301 is being manufactured. Alternatively, when the electronic device 301 is used by the user, at least a part of the program 140 may be downloaded from an external electronic device (e.g., the electronic device 302 or 304, or the server 308) or may be updated.

The OS 342 may control the management (e.g., allocating or retrieving) of one or more system resources (e.g., a process, a memory, or a power) of the electronic device 301. Additionally or alternatively, the operating system 342 may include one or more driver programs for driving any other hardware devices of the electronic device 301, for example, the input device 350, the sound output device 355, the display device 360, the audio module 370, the sensor module 376, the interface 377, the haptic module 379, the camera module 380, the power management module 388, the battery 389, the communication module 390, the subscriber identification module 396, or the antenna module 397.

The middleware 344 (or framework) may provide various functions to the application 346 such that a function or information provided from one or more resources of the electronic device 301 is able to be used by the application 346. The middleware 344 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a telephony manager 425, a voice recognition manager 427, or an audio manager 429.

The application manager 401 may manage, for example, a life cycle of the application 346. The window manager 403 may manage, for example, one or more GUI resources that are used in a screen. The multimedia manager 405 may seize, for example, one or more formats necessary to play media files and may perform encoding or decoding on the corresponding media file among the media files using a codec appropriate for the corresponding format selected from the formats. The resource manager 407 may manage, for example, a source code of the application 346 or a storage space of the memory 330. The power manager 409 may manage, for example, a capacity, a temperature, or a power of the battery 389 and may determine or provide relevant information necessary for an operation of the electronic device 301, using information associated with the capacity, the temperature, or the power. According to an embodiment, the power manager 409 may operate in conjunction with a basic input/output system (BIOS) (not illustrated) of the electronic device 301.

The database manager 411 may generate, search, or modify, for example, a database to be used by the application 346. The package manager 413 may install or update, for example, an application that is distributed in the shape of a package file. The connectivity manager 415 may manage, for example, the wireless connection or direct connection between the electronic device 301 and an external electronic device. The notification manager 417 may provide, for example, a function of notifying the user that a specified event (e.g., an incoming call, a message, or an alarm) occurs. The location manager 419 may manage, for example, location information of the electronic device 301. The graphic manager 421 may manage, for example, one or more graphic effects to be provided to the user or one or more user interfaces associated with the one or more graphic effects.

The security manager 423 may provide, for example, system security or user authentication. The telephony manage 425 may manage, for example, a voice call function or a video call function that is provided by the electronic device 301. The voice recognition manager 427 may transmit, for example, voice data of the user to the server 308, and may receive a command, which corresponds to a function to be performed in the electronic device 301 based at least partially on the voice data, or character data, which are converted based at least partially on the voice data, from the server 308.

For example, the audio manager 429 may manage an audio output descriptor or an audio output thread. For example, when audio data is output, the audio manager 429 may determine which audio output descriptor is applied to the audio data or through which audio output thread the audio data will be output.

For example, the audio manager 429 may determine through which hardware driver, audio data is delivered for audio output.

According to various embodiments, the audio manager 429 may be referred to as an "audio policy manager" or "audio flinger".

According to an embodiment, the middleware 444 may remove one or more components of existing components dynamically or may add new components. According to an embodiment, at least a part of the middleware 344 may be included as a part of the operating system 342 or may be implemented with separate software different from the operating system 342.

For example, the application 346 may include a home application 451, a dialer application 453, an SMS/MMS application 455, an instant message (IM) application 457, a browser application 459, a camera application 461, an alarm application 463, a contact application 465, a voice recognition application 467, an e-mail application 469, a calendar application 471, a media player application 473, an album application 475, a watch application 477, a health application 479, or an environment information application 481 (e.g., an atmospheric pressure, humidity, or temperature information measuring application). According to an embodiment, the application 346 may further include an information exchanging application that may support information exchange between the electronic device 301 and an external electronic device. The information exchanging application may include a notification relay application configured to transmit specified information (e.g., a call, a message, or an alarm) to an external electronic device or a device management application configured to manage the external electronic device. The notification relay application may transmit, for example, notification information corresponding to a specified event (e.g., an event that a mail is received) occurring in another application (e.g., the e-mail application 469) of the electronic device 301 to the external electronic device. Additionally or alternatively, the notification relay application may receive notification information from the external electronic device and may provide the received notification information to the user of the electronic device 301.

The device management application may control, for example, a power (e.g., turn-on or turn-off) or a function (e.g., a brightness, a resolution, or a focus of the display device 360 or the camera module 380) of the external electronic device communicating with the electronic device 301 or some components (e.g., the display device 360 or the camera module 380) of the external electronic device. Additionally or alternatively, the device management application may support the installation, deletion, or update of an application that operates in the external electronic device.

Figure 5:
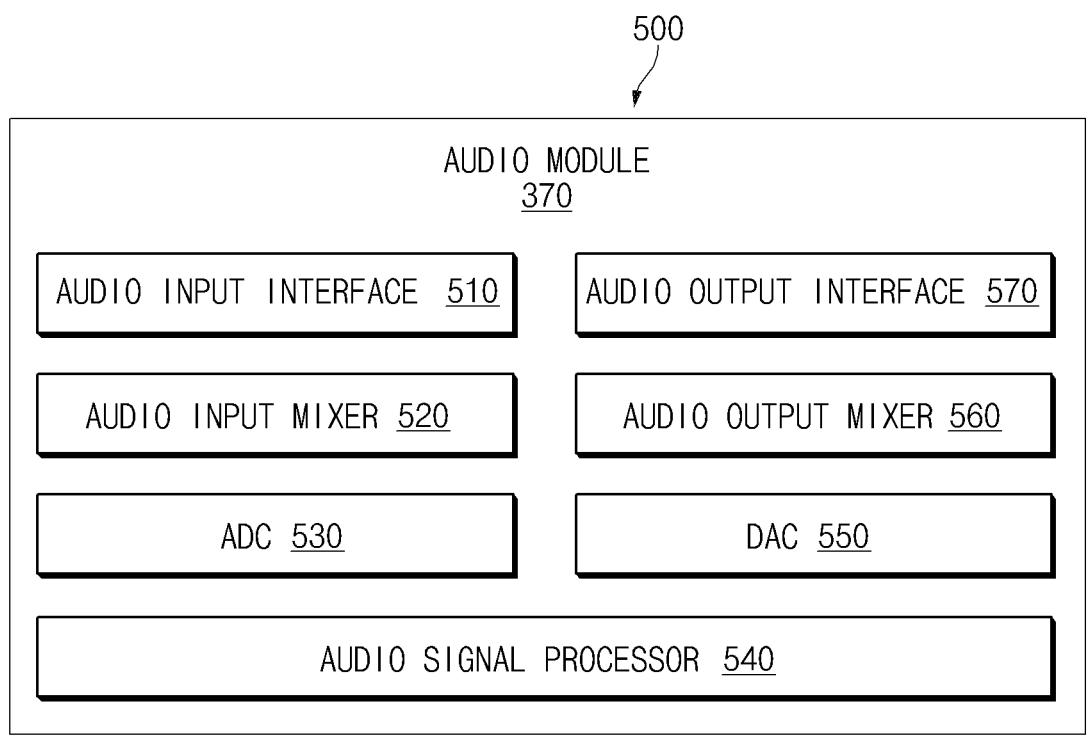
FIG. 5 is a block diagram illustrating an example audio module, according to various embodiments.

FIG. 5 is a block diagram 500 illustrating an example audio module 370 according to various embodiments.

Referring to FIG. 5, the audio module 370 may include, for example, an audio input interface 510, an audio input mixer 520, an analog to digital converter (ADC) 530, an audio signal processor 540, a digital to analog converter (DAC) 550, an audio output mixer 560, or an audio output interface 570. The audio module 370 may correspond to a hardware driver through which the audio manager 429 of FIG. 4 delivers audio data.

The audio input interface 510 may receive an audio signal corresponding to the sound obtained from the outside of the electronic device 301 through a part of the input device 350 or a microphone (e.g., a dynamic microphone, a condenser microphone, or a piezo microphone) separate from the electronic device 301. For example, when the audio signal is obtained from an external electronic device 302 (e.g., a headset or a microphone), the audio input interface 510 may be connected to the external electronic device 302, directly through the connecting terminal 378 or wirelessly (e.g., Bluetooth communication) through the wireless communication module 392 and then may receive an audio signal. According to an embodiment, the audio input interface 510 may receive a control signal (e.g., a volume adjustment signal received via an input button) associated with the audio signal obtained from the external electronic device 302. The audio input interface 510 may include a plurality of audio input channels and may receive an audio signal different for each corresponding audio input channel among the plurality of audio input channels. According to an embodiment, additionally or alternatively, the audio input interface 510 may receive an audio signal from another component (e.g., the processor 320 or the memory 330) of the electronic device 301.

The audio input mixer 520 may synthesize the input plurality of audio signals into at least one audio signal. For example, according to an embodiment, the audio input mixer 520 may synthesize a plurality of analog audio signals entered through the audio input interface 510 into at least one analog audio signal.

The ADC 530 may convert the analog audio signal into a digital audio signal. For example, according to an embodiment, the ADC 530 may convert the analog audio signal received through the audio input interface 510 or, additionally or alternatively, the analog audio signal synthesized via the audio input mixer 520 into the digital audio signal.

The audio signal processor 540 may perform various processing on the digital audio signal received through the ADC 530 or the digital audio signal received from another component of the electronic device 301. For example, according to an embodiment, the audio signal processor 540 may perform sampling rate change, application of one or more filters, interpolation processing, amplification or attenuation of all or some frequency bands, noise processing (e.g., noise or echo attenuation), channel change (e.g., switching between mono and stereo), mixing, or extraction of the specified signal on one or more digital audio signals. According to an embodiment, one or more functions of the audio signal processor 540 may be implemented in the form of an equalizer.

The DAC 550 may convert the digital audio signals into an analog audio signal. For example, according to an embodiment, the DAC 550 may convert the digital audio signal processed by the audio signal processor 540 or the digital audio signal obtained from another component of the electronic device 301 (e.g., the processor 320 or the memory 330) into an analog audio signal.

The audio output mixer 560 may synthesize a plurality of audio signals to be output into at least one audio signal. For example, according to an embodiment, the audio output mixer 560 may synthesize an audio signal, which is converted into an analog signal through the DAC 550, and another analog audio signal (e.g., the analog audio signal received through the audio input interface 510) into at least one analog audio signal.

The audio output interface 570 may output the analog audio signal converted through the DAC 550 or, additionally or alternatively, the analog audio signal synthesized by the audio output mixer 560 to the outside of the electronic device 301 through the sound output device 355. For example, the sound output device 355 may include a speaker or a receiver, such as a dynamic driver or a balanced armature driver. According to an embodiment, the sound output device 355 may include a plurality of speakers. In this case, the audio output interface 570 may output audio signals having a plurality of different channels (e.g., stereo or 5.1 channel) through at least part of the plurality of speakers. According to an embodiment, the audio output interface 570 may be connected to an external electronic device 302 (e.g., an external speaker or headset), directly via the connecting terminal 378 or wirelessly via the wireless communication module 392 and then may output audio signals.

According to an embodiment, the audio module 370 may generate at least one digital audio signal by synthesizing a plurality of digital audio signals, using at least one function of the audio signal processor 540 without separately including the audio input mixer 520 or the audio output mixer 560.

According to an embodiment, the audio module 370 may include an audio amplifier (not shown) (e.g., a speaker amplification circuit) capable of amplifying an analog audio signal entered through the audio input interface 510 or an audio signal to be output through the audio output interface 570. According to an embodiment, the audio amplifier may be implemented as a module separate from the audio module 370.

Figure 6:
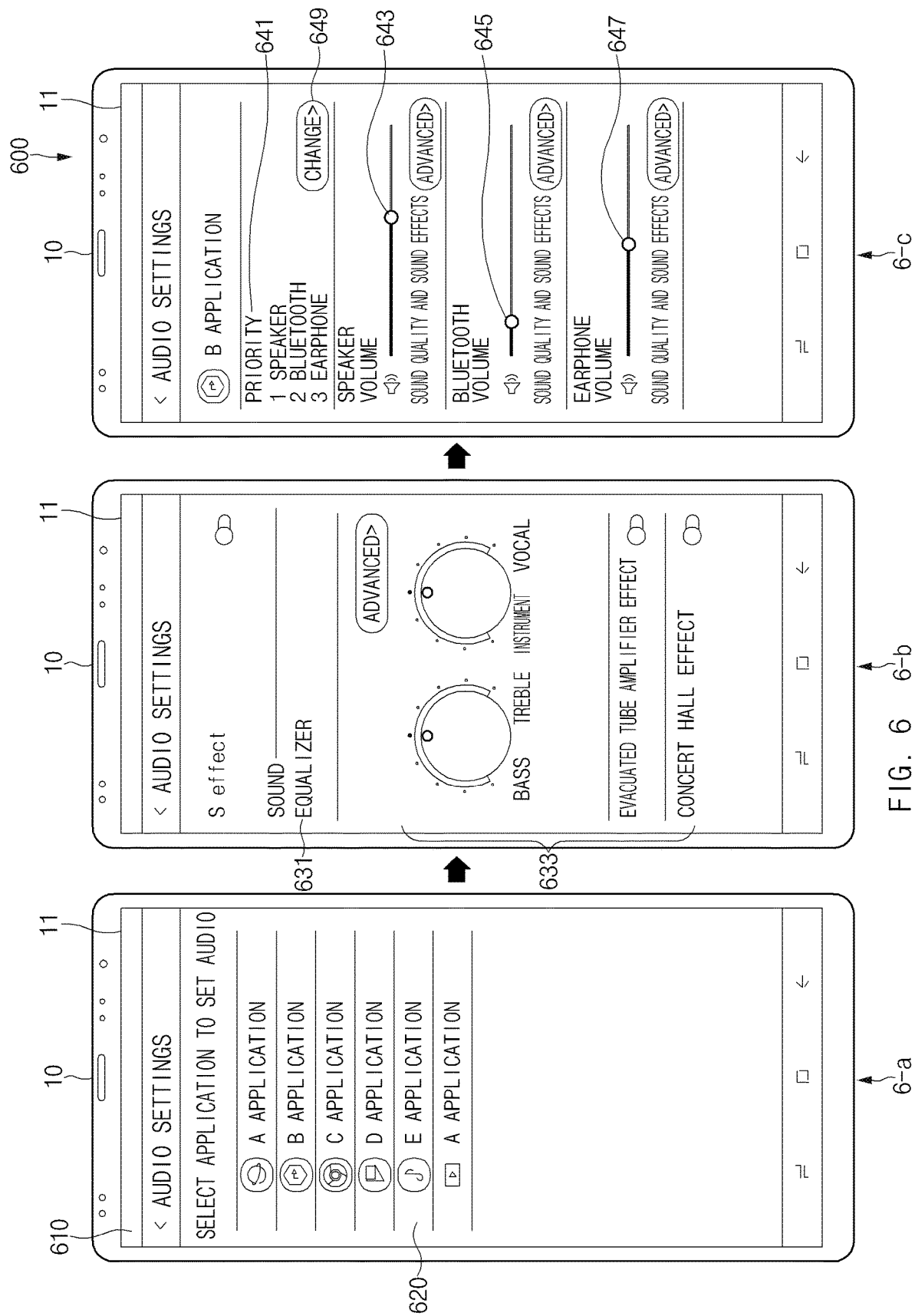
FIG. 6 is diagram illustrating an example user interface through which an electronic device is capable of adjusting an audio setting value, according to an embodiment.

FIG. 6 is a diagram 600 illustrating an example user interface through which an electronic device is capable of adjusting an audio setting value, according to an embodiment.

According to an embodiment, the electronic device 10 may provide a user with an audio policy input user interface for setting a value for at least one or more audio setting values. For example, the electronic device 10 may obtain a new application; while the new application is installed in the electronic device 10 or when the installation of the new application is completed, the electronic device 10 may provide the audio policy input user interface. When the electronic device 10 executes a new application for the first time after installing the new application, the electronic device 10 may provide the audio policy input user interface. The electronic device 10 may provide the audio policy input user interface in response to an external input (e.g., a user input) for making a request for the execution of a function of setting an audio policy for an application.

Referring to 6-a of FIG. 6, the electronic device 10 may display a list 620 of applications for inputting an audio policy on an audio policy input user interface 610. For example, the electronic device 10 may display a list of various types of applications, in each of which audio data is capable of being generated, such as a game, a phone, a text, a navigation, a music, an alarm, a schedule, a system setting, a web browser, an SNS, a camera, and the like on the audio input policy user interface 610.

Referring to 6-a and 6-b of FIG. 6, when the electronic device 10 detects the occurrence of an event in which a single application in the application list 620 displayed on a display 11 is selected, the electronic device 10 may display objects for adjusting audio effects on the display 11.

Referring to 6-b of FIG. 6, the electronic device 10 may display an object 631 for adjusting an equalizer (EQ) or an object 633 for adjusting whether to apply various audio effects, on the display 11. When the electronic device 10 detects the occurrence of an event of adjusting the values of the object 631 for adjusting an equalizer (EQ) or the object 633 for adjusting whether to apply various audio effects, the electronic device 10 may adjust the audio setting value to the adjusted value.

Referring to 6-c of FIG. 6, the electronic device 10 may display an object 641 for adjusting an output path priority, an object 643 for adjusting the volume value of a speaker, an object 645 for adjusting the volume value of Bluetooth, or an object 647 for adjusting the volume value of an earphone, on the display 11.

According to an embodiment, when the electronic device 10 detects the occurrence of an event of selecting an object 649 for adjusting the output path priority, the electronic device 10 may list the currently set output paths in order of priority and may display a pop-up window for changing the priority depending on a user input, on the display 11. However, embodiments of the disclosure are not limited thereto. The electronic device 10 may provide the user with various objects for adjusting the output path priority.

According to an embodiment, when the electronic device 10 detects the occurrence of an event of adjusting the volume value, using the object 643 for adjusting the volume value of the speaker, the object 645 for adjusting the volume value of Bluetooth, or the object 647 for adjusting the volume value of the earphone, the electronic device 10 may adjust the audio setting value to the adjusted volume value.

According to various embodiments, the electronic device 10 may generate and store a dedicated audio output descriptor corresponding to a function included in a single application. Alternatively, the electronic device 10 may generate and store a dedicated audio output thread in response to the function of an application.

In this example, when a single application is selected from 6-a of FIG. 6, the electronic device 10 may display the functions of the selected application on the display 11. For example, the electronic device 10 may display a streaming function and the downloaded music playing function on the display 11.

The electronic device 10 may provide 6-b or 6-c of FIG. 6 to guide the user to enter an audio setting value corresponding to the selected function, in response to the user input to select one of functions.

FIGS. 7A, 7B, 7C, 7D and 7E are diagrams illustrating an example of outputting audio data to an electronic device using an audio output descriptor corresponding to an application and an audio output descriptor of the electronic device, according to an embodiment.

Referring to FIG. 7A, the electronic device 10 may store a dedicated audio output descriptor 710, to which the audio policy of the first application is reflected, and an audio output descriptor 720 to which the audio policy of the electronic device 10 is reflected.

According to an embodiment, the dedicated audio output descriptor 710 may include an output path 711, an output path priority 713, and a volume value 715 according to each output path.

For example, the output path 711 of the dedicated audio output descriptor 710 may include an earphone, a Bluetooth, and a speaker. In addition, the output path priority 713 of the dedicated audio output descriptor 710 may be the earphone of a first priority, the Bluetooth of a second priority, and the speaker of a third priority. In addition, in the case of the volume value 715 for each output path of the dedicated audio output descriptor 710, the earphone may be 10; the Bluetooth may be 15; the speaker may be 10.

According to an embodiment, the audio output descriptor 720 to which the audio policy of the electronic device 10 is reflected may include an output path 721 and a volume value 725 according to each output path.

For example, the output path 721 of the audio output descriptor 720 to which the audio policy of the electronic device 10 is reflected may include an earphone, a Bluetooth, and a speaker. In the case of the volume value 725 for each output path of the audio output descriptor 720 to which the audio policy of the electronic device 10 is reflected, the earphone may be 4; the Bluetooth may be 8; the speaker may be 12.

Figure 7B:
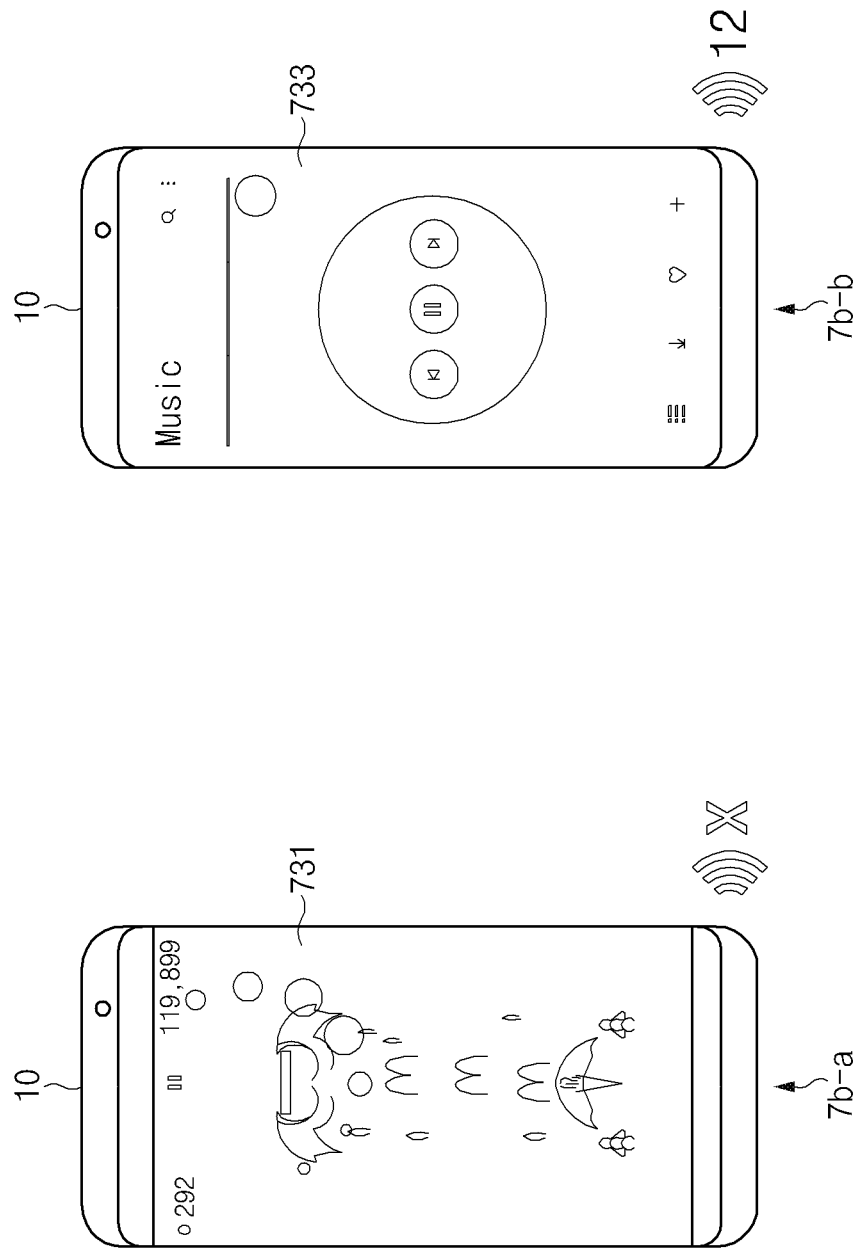
FIG. 7B is a diagram illustrating an example of outputting audio data to an electronic device using an audio output descriptor corresponding to an application and an audio output descriptor of the electronic device, according to an embodiment.

Referring to FIG. 7B, the electronic device 10 may execute two applications at the same time.

According to an embodiment, the electronic device 10 may execute a first application and may simultaneously execute a second application. For example, executing the first application and simultaneously executing the second application may refer, for example, to the first application being executed and displayed on a display while the second application is not displayed on the display but only an audio signal is output.

Executing the first application and simultaneously executing the second application may refer, for example, to one display region being divided into a plurality of regions, the first application is displayed in one region while being executed, and the second application is displayed in another region while being executed.

Executing the first application and simultaneously executing the second application may refer, for example, to an electronic device, which includes a plurality of displays, displaying the first application on one display while executing the first application and displays the second application on another display while executing the second application.

Hereinafter, it is assumed, for convenience and ease of explanation, that the first application is a game application and the second application is a music application. In this example, the electronic device 10 may apply the dedicated audio output descriptor 710 to audio data output in association with the game application; the electronic device 10 may apply the audio output descriptor 720, to which the audio policy of the electronic device 10 is reflected, to audio data output in association to the music application.

Referring to 7b-a of FIG. 7B, when identifying that there is no earphone or Bluetooth device connected to the electronic device 10, the electronic device 10 may output audio data generated by the game application 731 using the speaker at the third priority of the dedicated audio output descriptor 710. In this example, because the volume value of the speaker included in the dedicated audio output descriptor 710 is '0', the electronic device 10 may not output audio data through the speaker.

At the same time, referring to 7b-b of FIG. 7B, the electronic device 10 may output audio data generated by the music application 733 using the speaker included in the audio output descriptor 720, to which the audio policy of the electronic device 10 is reflected. In this example, because the volume value of the speaker included in the audio output descriptor 720, to which the audio policy is reflected, is 12, the electronic device 10 may set the volume value of audio data to 12 to output the audio data.

Figure 7C:
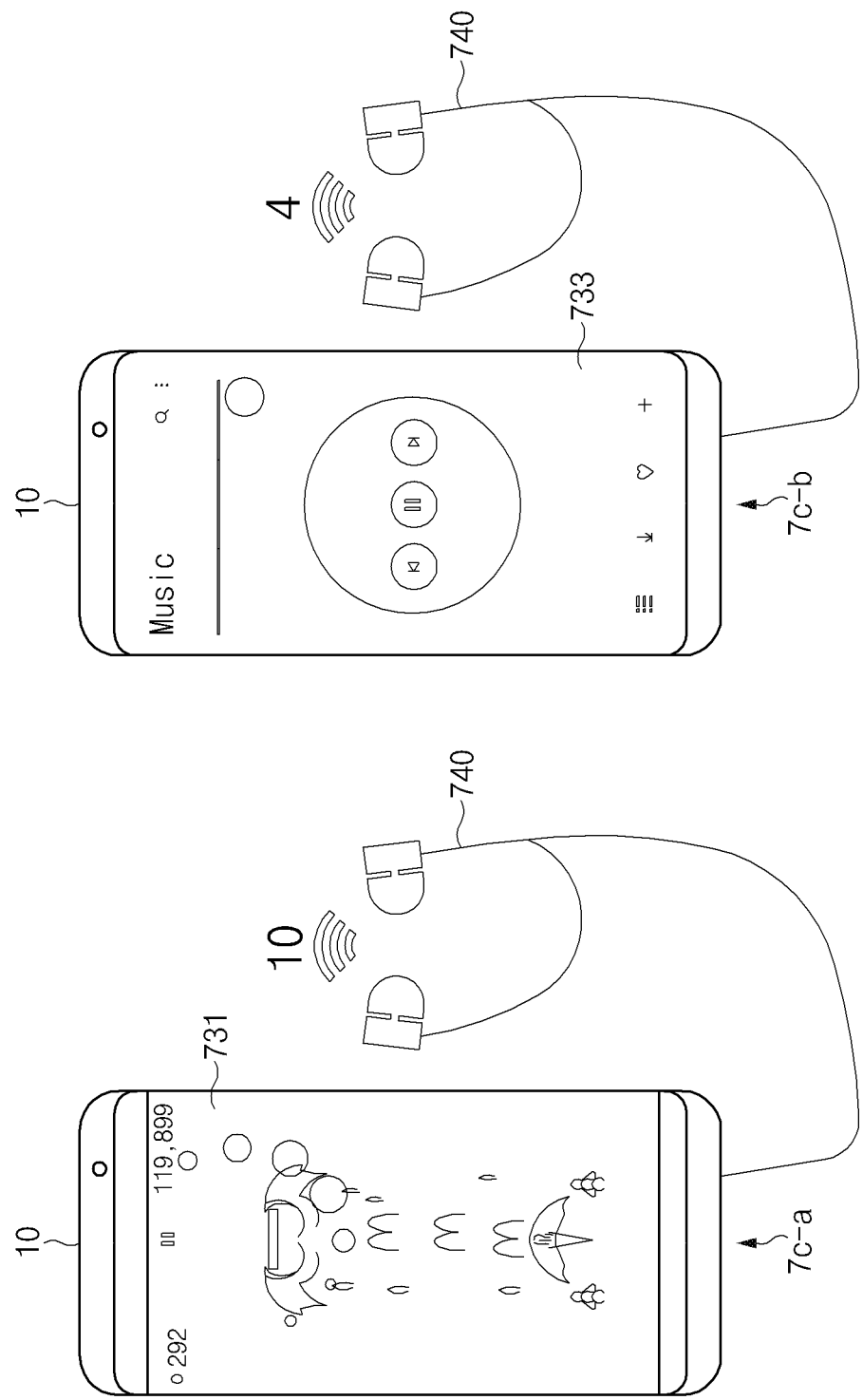
FIG. 7C is a diagram illustrating an example of outputting audio data to an electronic device using an audio output descriptor corresponding to an application and an audio output descriptor of the electronic device, according to an embodiment.

Referring to 7c-a of FIG. 7C, the electronic device 10 may identify that the earphone 740 is connected to the electronic device 10. When identifying the connection of an earphone 740, the electronic device 10 may output audio data generated by the game application 731 using the earphone at the first priority of the dedicated audio output descriptor 710. In this example, because the volume value of the earphone included in the dedicated audio output descriptor 710 is 10, the electronic device 10 may set the volume value of audio data to 12 to output the audio data.

At the same time, referring to 7c-b of FIG. 7C, when identifying the connection of the earphone 740, the electronic device 10 may output audio data generated by the music application 733 using the earphone included in the audio output descriptor 720, to which the audio policy of the electronic device 10 is reflected. In this example, because the volume value of the earphone included in the audio output descriptor 720, to which the audio policy of the electronic device 10 is reflected, is 4, the electronic device 10 may set the volume value of audio data to 4 to output the audio data.

Figure 7D:
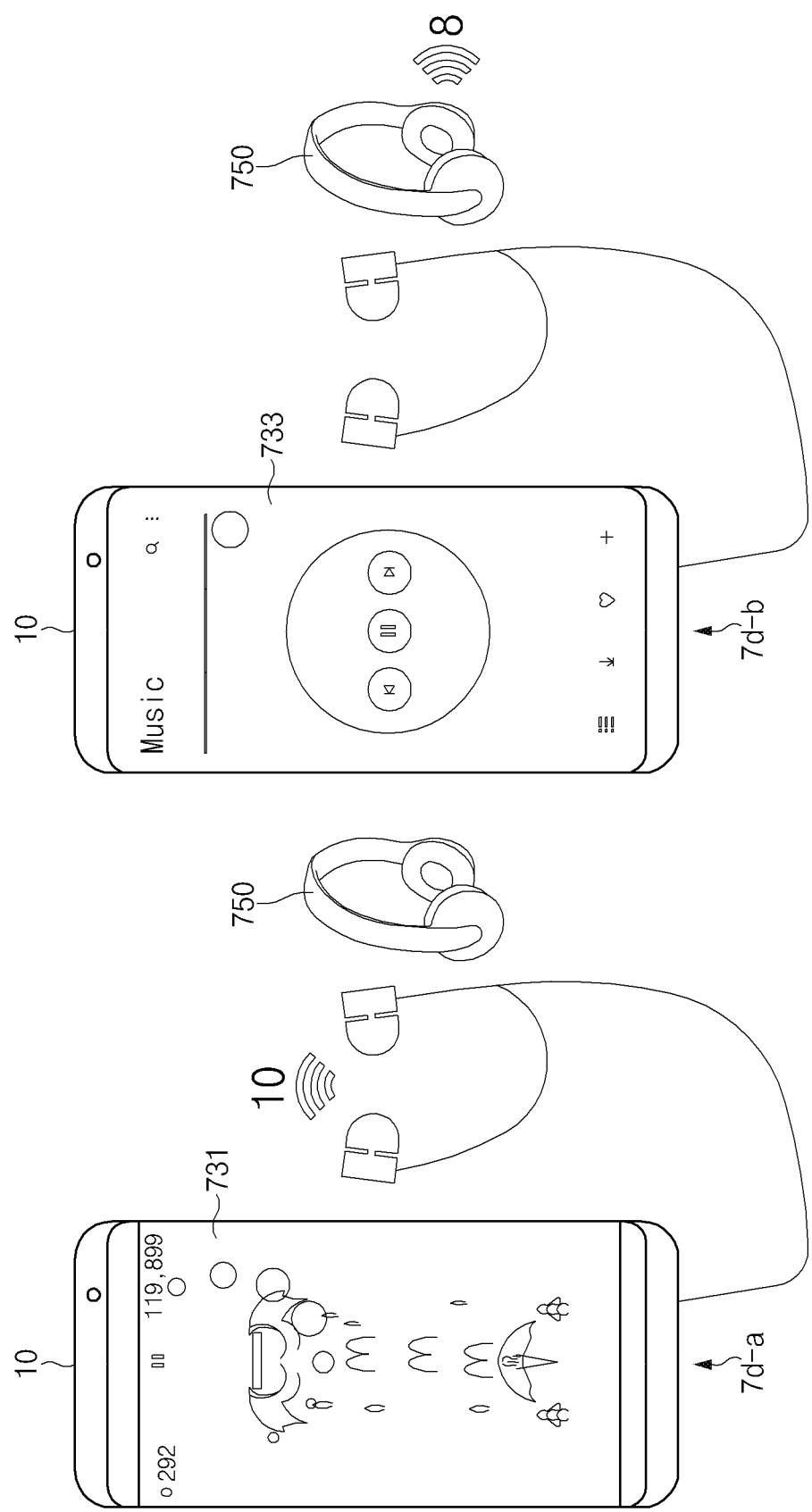
FIG. 7D is a diagram illustrating an example of outputting audio data to an electronic device using an audio output descriptor corresponding to an application and an audio output descriptor of the electronic device, according to an embodiment.

Referring to 7d-a of FIG. 7D, the electronic device 10 may identify that a Bluetooth headset 750 is connected to the electronic device 10. When identifying the connection of the Bluetooth headset 750, the electronic device 10 may identify the priority of the dedicated audio output descriptor 710. The electronic device 10 may identify that the priority of the earphone is ahead of the priority of the Bluetooth headset; the electronic device 10 may output audio data generated by the game application 731 using the earphone in the first priority. In this example, because the volume value of the earphone included in the dedicated audio output descriptor 710 is 10, the electronic device 10 may set the volume value of audio data to 10 to output the audio data.

At the same time, referring to 7d-b of FIG. 7D, when identifying the connection of the Bluetooth headset 750, the electronic device 10 may output audio data generated by the music application 733 using the Bluetooth included in the audio output descriptor 720, to which the audio policy of the electronic device 10 is reflected. In this example, because the volume value of the Bluetooth included in the audio output descriptor 720, to which the audio policy of the electronic device 10 is reflected, is 8, the electronic device 10 may set the volume value of audio data to 8 to output the audio data.

Figure 7E:
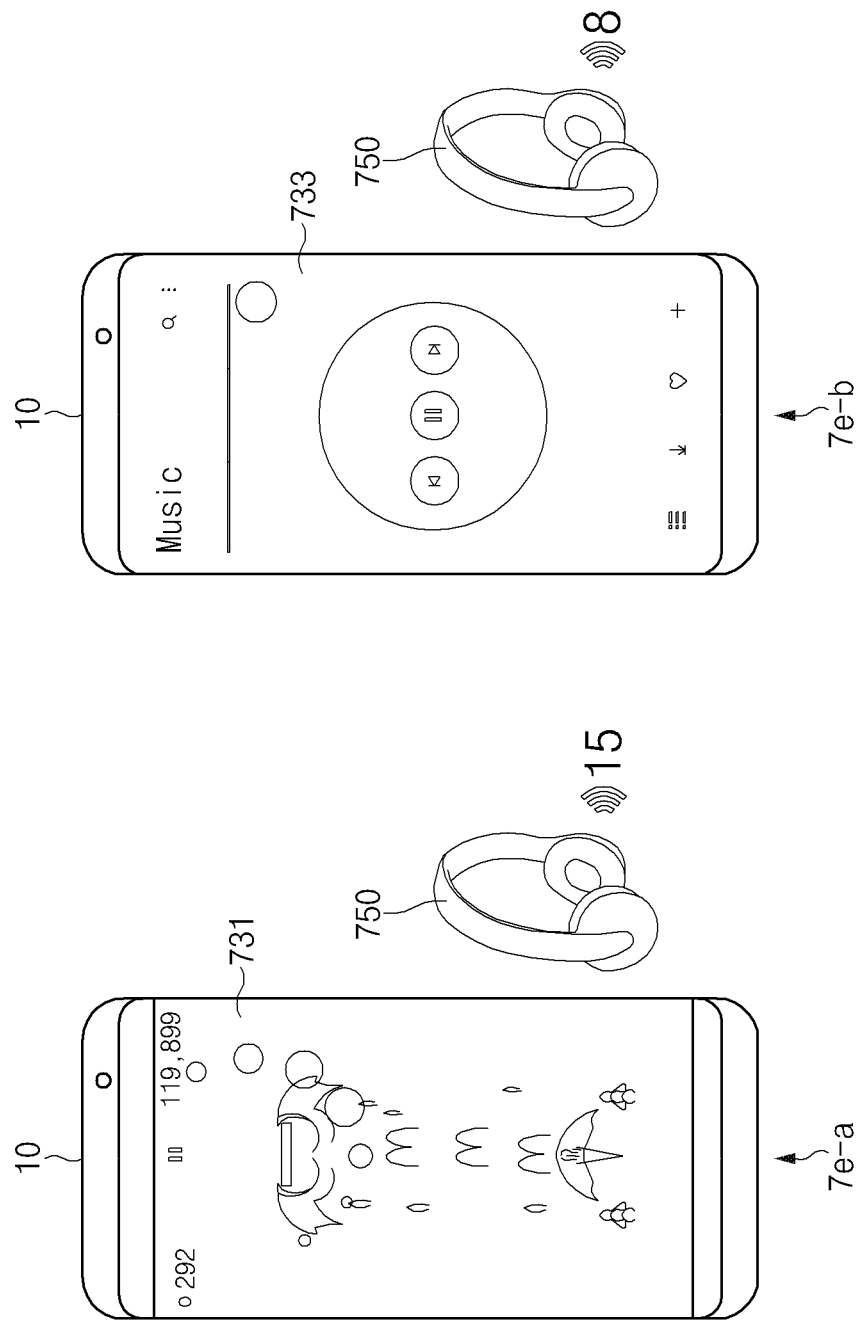
FIG. 7E is a diagram illustrating an example of outputting audio data to an electronic device using an audio output descriptor corresponding to an application and an audio output descriptor of the electronic device, according to an embodiment.

Referring to 7*e-a* of FIG. 7E, the electronic device 10 may identify that the earphone 740 is removed from the electronic device 10. When identifying the disconnection of the earphone 740, the electronic device 10 may identify the priority of the dedicated audio output descriptor 710. The electronic device 10 may identify that the Bluetooth headset 750 is connected and may output audio data generated by the game application 731, using Bluetooth in the second priority. In this example, because the volume value of the Bluetooth included in the dedicated audio output descriptor 710 is 15, the electronic device 10 may set the volume value of audio data to 15 to output the audio data.

At the same time, referring to 7*e-b* of FIG. 7E, when identifying the disconnection of the earphone 740, the electronic device 10 may output audio data generated by the music application 733 using the Bluetooth included in the audio output descriptor 720, to which the audio policy of the electronic device 10 is reflected. In this example, because the volume value of the Bluetooth included in the audio output descriptor 720, to which the audio policy of the electronic device 10 is reflected, is 8, the electronic device 10 may set the volume value of audio data to 8 to output the audio data.

As such, the electronic device 10 according to an embodiment may apply the dedicated audio output descriptor corresponding to a specific application to audio data generated by a specific application and may apply the audio output descriptor of the electronic device to audio data generated by another application, the electronic device 10 may mix and output two pieces of audio data together, thereby improving the convenience of a user utilizing a plurality of applications simultaneously.

Figure 8:
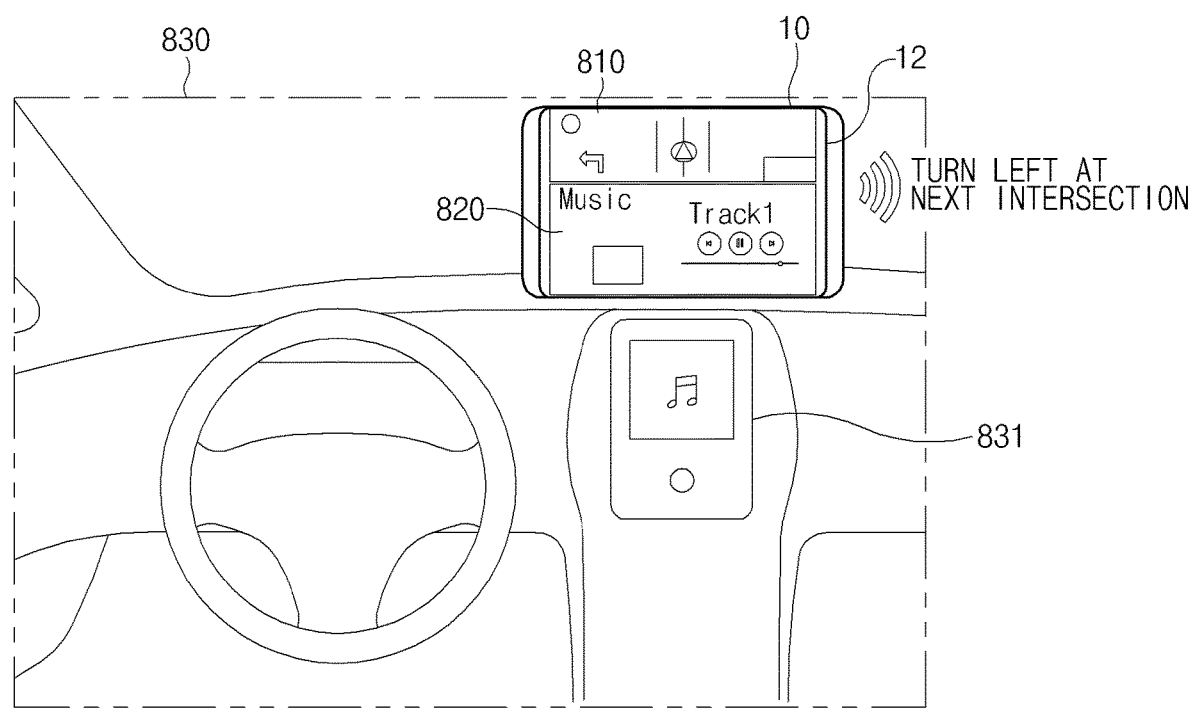
FIG. 8 is a diagram illustrating an example of executing a navigation application in an electronic device according to an embodiment.

FIG. 8 is a diagram illustrating an example of executing a navigation application in an electronic device according to an embodiment.

Referring to FIG. 8, the electronic device 10 may execute a navigation application 810 and a music application 820 simultaneously. For example, the electronic device 10 may divide a display 12 into a plurality of regions capable of being folded and unfolded in a folder form; the electronic device 10 may execute the navigation application 810 while displaying the navigation application 810 in one region and may execute the music application 820 while displaying the music application 820 in another region.

According to an embodiment, the electronic device 10 may store a dedicated audio output descriptor corresponding to the navigation application 810 and a dedicated audio output descriptor corresponding to the music application 820. For example, the dedicated audio output descriptor corresponding to the navigation application 810 may be configured to output audio data generated in association with the navigation application 810, through a speaker included in the electronic device 10. Furthermore, the dedicated audio output descriptor corresponding to the music application 820 may be configured to output audio data generated in association with the music application 820, through Bluetooth.

Referring to FIG. 8, the electronic device 10 may be connected to the audio output device 831 of a vehicle 830 using Bluetooth. In a state where the electronic device 10 and the audio output device 831 of the vehicle 830 are connected using Bluetooth, the audio output device 831 of the vehicle 830 may generate and output audio data by itself. When the audio output device 831 of the vehicle 830 generates and outputs audio data by itself, audio data transmitted from the electronic device 10 to the audio output device 831 of the vehicle 830 using the Bluetooth communication method may not be output.

However, the electronic device 10 may output audio data output from the navigation application 810 by applying an audio output descriptor corresponding to the navigation application 810, using the speaker of the electronic device 10.

As such, according to an embodiment, the electronic device 10 may provide the user convenience suitable for the purpose of the application by setting a separate audio output path according to the application.

Figure 9:
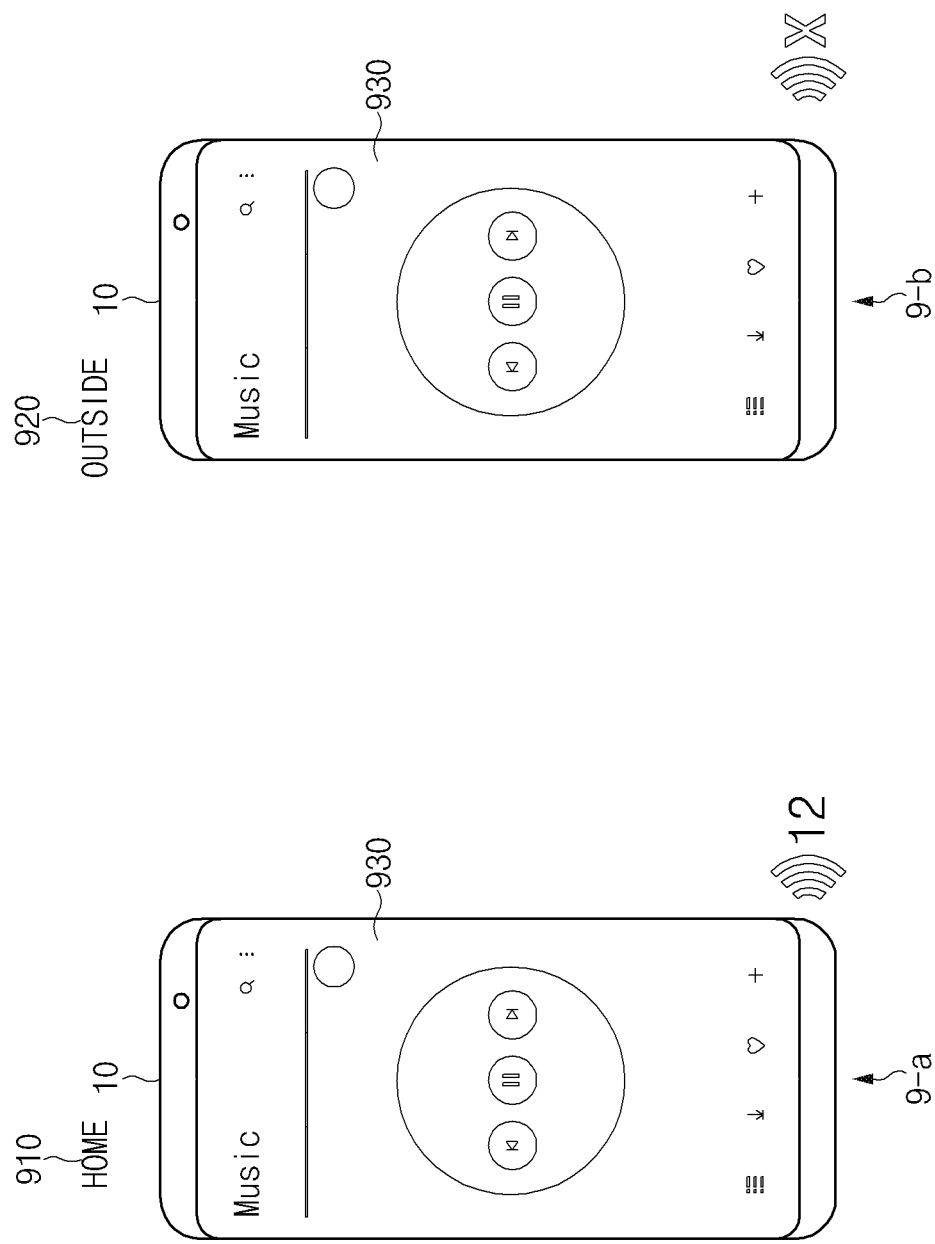
FIG. 9 is a diagram illustrating an example in which an electronic device differently outputs audio data in response to state information of an electronic device, according to an embodiment.

FIG. 9 is a diagram illustrating an example in which an electronic device differently outputs audio data in response to state information of an electronic device, according to an embodiment.

According to an embodiment, the electronic device 10 may store an audio output descriptor in response to the state information of the electronic device. For example, the electronic device 10 may store a plurality of dedicated audio output descriptors corresponding to the application. For example, the electronic device 10 may store a first dedicated audio output descriptor applied to a situation in which the electronic device 10 is in a first state and a second dedicated audio output descriptor applied to a situation in which the electronic device 10 is in a second state.

Referring to FIG. 9, the electronic device 10 may assign and store a home 910 to a first location (e.g., the first state of the electronic device) and may assign and store an outside (e.g., company) 920 to a second location (e.g., the second state of an electronic device).

According to an embodiment, the electronic device 10 may store a plurality of dedicated audio output descriptors in response to the music application 930. For example, the electronic device 10 may store a first dedicated audio output descriptor corresponding to the first location (e.g., home) 910 and a second dedicated audio output descriptor corresponding to the second location (e.g., company) 920. For example, referring to 9-*a*, in the case of the first dedicated audio output descriptor, an output path may be a speaker and a volume value may be 12. For example, referring to 9-*b*, in the case of the second dedicated audio output descriptor, an output path may be a speaker and a volume value may be 0.

For this reason, the electronic device 10 may differently set volume values of audio data output from the music application 930 in response to the identified location information. For example, when the music application 930 is played in a state where it is identified that the location of the electronic device 10 is the home 910, the electronic device 10 may output audio data of a volume value of 12 using a speaker. When the music application 930 is played in a state where it is identified that the location of the electronic device 10 is the company 920, the electronic device 10 may output audio data of a volume value of 0 using a speaker.

According to various embodiments, the electronic device 10 may store an audio output thread in response to the state information of the electronic device. For example, the electronic device 10 may generate and store a first dedicated audio output thread used in a state where the electronic device 10 is in the first state and a second dedicated audio output thread used in a state where the electronic device 10 is in the second state.

As described above, the electronic device 10 may output audio data, using the first dedicated audio output thread and the second dedicated audio output thread in response to the location of the electronic device 10.

Figure 10:
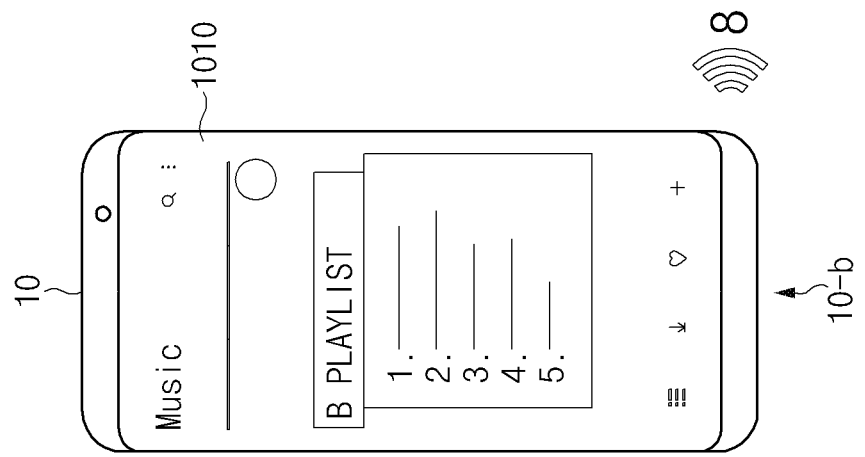
FIG. 10 is a diagram illustrating an example in which an electronic device differently outputs audio data in response to a function of an application, according to an embodiment.
Figure 10:
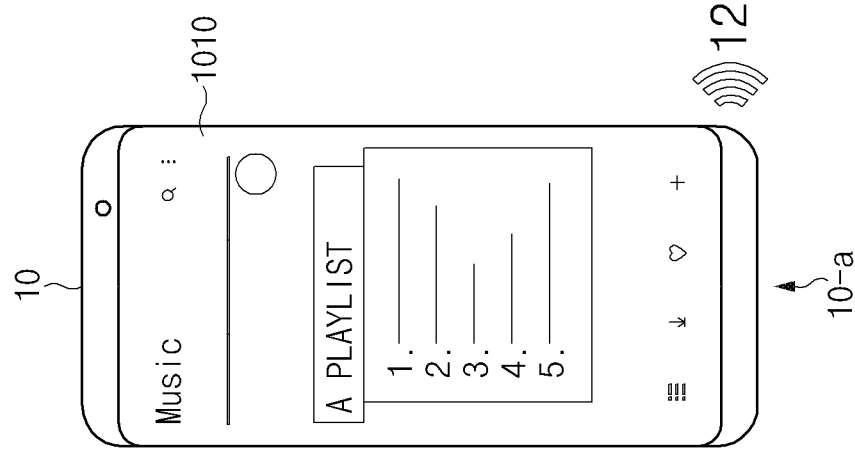

FIG. 10 is a diagram illustrating an example in which an electronic device differently outputs audio data in response to a function of an application, according to an embodiment.

According to an embodiment, the electronic device 10 may store an audio setting item included in an audio output descriptor in response to a function included in an application. For example, the audio setting value may include the preset function of the application. For example, the audio setting value may store a volume value, an output path, the priority of an output path, or an audio effect in response to a first function and may store a volume value, an output path, the priority of an output path, or an audio effect in response to a second function.

Referring to 10-*a*, in response to the first function (e.g., 'A' playlist playback), the electronic device 10 may store the speaker as the output path and may store '12' as the volume value. Referring to 10-*b*, in response to the second function (e.g., 'B' playlist playback), the electronic device 10 may store the speaker as the output path and may store '8' as the volume value.

For this reason, when the electronic device 10 executes a music application 1010 and plays 'A' playlist, the electronic device 10 may set the volume value to '12' and may output audio data, using the speaker. When the electronic device 10 executes the music application 1010 and plays 'B' playlist, the electronic device 10 may set the volume value to '8' and may output audio data, using the speaker.

According to various embodiments, the electronic device 10 may store an audio output descriptor in response to a function included in an application. For example, the electronic device 10 may store a plurality of dedicated audio output descriptors corresponding to the function of an application. For example, the electronic device 10 may store a first dedicated audio output descriptor to be applied when the first function of the application is executed and a second dedicated audio output descriptor to be applied when the second function of the application is executed.

Referring to FIG. 10, the electronic device 10 may store the first dedicated audio output descriptor in response to a first function (e.g., playback of streaming music). In addition, the electronic device 10 may store the second dedicated audio output descriptor in response to a second function (e.g., playback of downloaded music). For example, in the case of the first dedicated audio output descriptor, an output path may be a speaker and a volume value may be 12. For example, in the case of the second dedicated audio output descriptor, an output path may be a speaker and a volume value may be 8.

For this reason, when the electronic device 10 executes the music application 1010 and plays audio data using a streaming music playback function, the electronic device 10 may set the volume value to '12' and may output audio data, using the speaker. When the electronic device 10 executes the music application 1010 and plays audio data using a function of playing the downloaded music, the electronic device 10 may set the volume value to '8' and may output audio data, using the speaker.

According to various embodiments, the electronic device 10 may store an audio output thread in response to the function of the electronic device. For example, the electronic device 10 may generate and store a first dedicated audio output thread used in a state where the electronic device 10 executes the first function and a second dedicated audio output thread used in a state where the electronic device 10 executes the second function.

As described above, the electronic device 10 may output audio data, using the first dedicated audio output thread and the second dedicated audio output thread in response to the execution of functions of the electronic device 10.

As such, the electronic device 10 according to an embodiment may include a plurality of dedicated audio outputs corresponding to specific functions of an application. The electronic device 10 may store a dedicated audio output that includes the specific function of the application.

Figure 11:
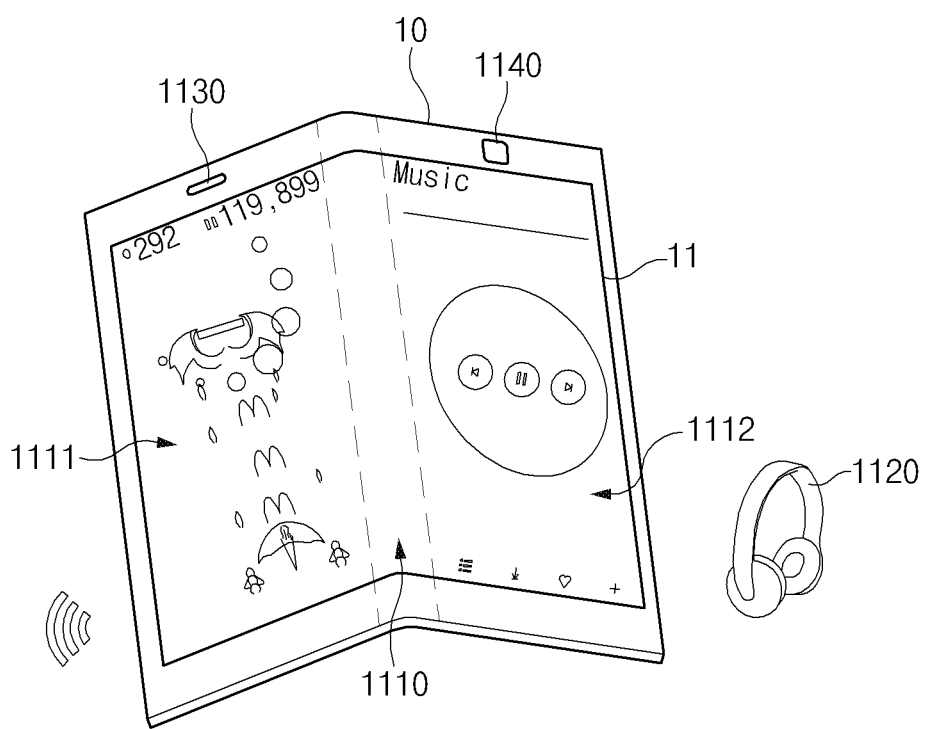
FIG. 11 is a diagram illustrating an example in which an electronic device outputs audio data in response to state information of an electronic device, according to an embodiment.

FIG. 11 is a diagram illustrating an example in which an electronic device outputs audio data in response to state information of an electronic device, according to an embodiment.

Referring to FIG. 11, the electronic device 10 may be a foldable electronic device. For example, the electronic device 10 may divide a display 11 into a first region 1111 and a second region 1112 based on a reference region 1110 capable of folding the display 11. The electronic device 10 may provide a first speaker 1130 at a portion of the first region 1111 and may provide a second speaker 1140 on a portion of the second region 1112.

According to an embodiment, the electronic device 10 may store a first dedicated audio output descriptor in response to a first application (e.g., game). In addition, the electronic device 10 may store a second dedicated audio output descriptor in response to a second application (e.g., music playback).

According to an embodiment, the electronic device 10 may identify a currently active region; the electronic device 10 may apply a value stored in the first dedicated audio output descriptor to audio data output from the game application executed on the first surface 1111 to output the audio data using the first speaker 1130.

At the same time, the electronic device 10 may apply the value stored in the second dedicated audio output descriptor to audio data output from the music playing application executed on the second side 1112 and may output the audio data output using the Bluetooth headset 1120.

Figure 12:
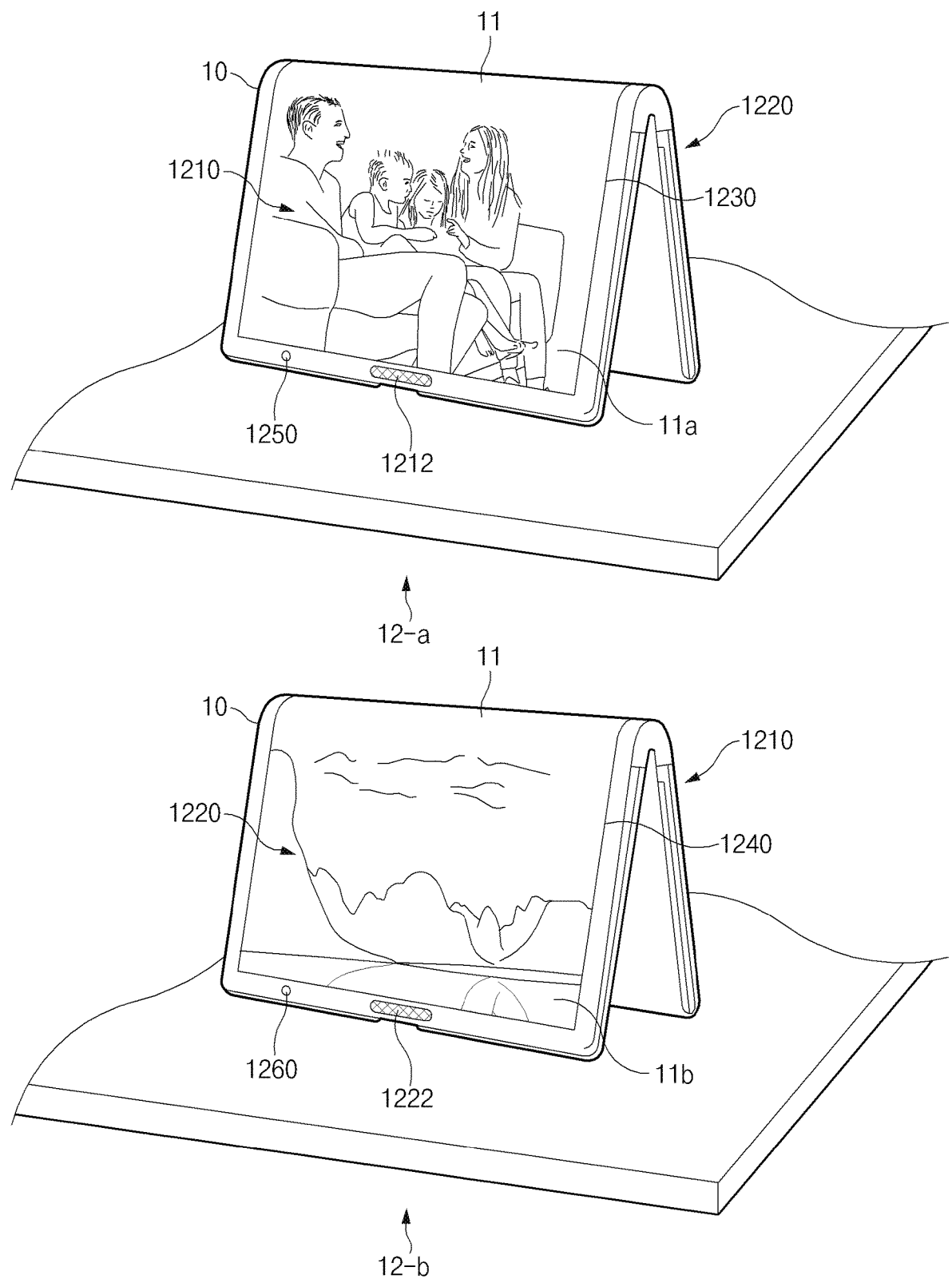
FIG. 12 is a diagram illustrating an example in which an electronic device outputs audio data in response to state information of an electronic device, according to an embodiment.

FIG. 12 is a diagram illustrating an example in which an electronic device outputs audio data in response to state information of an electronic device, according to an embodiment.

Referring to FIG. 12, the electronic device 10 may be a foldable electronic device. For example, the electronic device 10 including the display 11 may be folded to divide the display 11 into a first region 1210 and a second region 1220. Referring to 12-*a*, the electronic device 10 may provide a first speaker 1212 at a portion of the first region 1210. Referring to 12-*b*, the electronic device 10 may provide a second speaker 1222 on a portion of the second region 1220. The first speaker 1212 and the second speaker 1222 may be directional speakers that output sound in a specific direction.

According to an embodiment, the electronic device 10 may execute different applications, using a region 11*a* of the display 11 included in the first region 1210 and a region 11*b* of the display 11 included in the second region 1220; the first region 1210 and the second region 1220 may be positioned at a specific angle.

For example, the electronic device 10 may execute a first image playing application 1230 in the region 11*a* of the display 11 included in the first region 1210, using the first dedicated audio output descriptor; the electronic device 10 may execute a second image playing application 1240 in the region 11*b* of the display 11 included in the second region 1220, using the second dedicated audio output descriptor.

In this case, the electronic device 10 may differently apply the volume values of the speakers 1212 and 1222 in response to each dedicated audio output descriptor.

According to various embodiments, the electronic device 10 may store a first dedicated audio output descriptor corresponding to first account information or a first profile using the first image playing application 1230 and may store a second dedicated audio output descriptor corresponding to second account information or a second profile. The account information or profile may be unique information of each user capable of distinguishing between users when a plurality of users utilize the single electronic device 10.

In this case, the electronic device 10 may execute the first image playing application 1230 executed in the first account or the first profile, in the region 11a of the display 11 included in the first region 1210 and may execute the second image playing application 1240 executed in the second account or the second profile in one region 11b of the display 11 included in the second region 1220.

According to an embodiment, the electronic device 10 may further include a first camera 1250 provided in the first region 1210 and a second camera 1260 provided in the second region 1220. In this case, the electronic device 10 may recognize a user located in front of the electronic device 10 and may execute an application in response to the recognized direction.

For example, when the user is recognized through the first camera 1250 provided in the first region 1210, the electronic device 10 may activate the first region 1210 and may execute an application.

Various embodiments of the disclosure may be implemented with software (e.g., program 340) including one or more instructions stored in a storage medium (e.g., the internal memory 336 or the external memory 338) readable by a machine (e.g., the electronic device 301). For example, the processor (e.g., the processor 320) of the machine (e.g., the electronic device 301) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, the 'non-transitory' storage medium is a tangible device and may not include a signal (e.g., electromagnetic waves), and this term does not distinguish between the case where data is semi-permanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to various embodiments, each component (e.g., a module or a program) of the above-described components may include a single entity or a plurality of entities. According to various embodiments, one or more of the components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, program, or other components may be executed by a successive method, a parallel method, a repeated method, or a heuristic method, or one or more of the operations may be executed in different sequences or omitted. Alternatively, one or more other operations may be added.

In accordance with an electronic device and a controlling method thereof according to various example embodiments, an electronic device may generate a dedicated audio output descriptor corresponding to an application, may apply the dedicated audio output descriptor to audio data generated by the corresponding application, and may output the audio data together with other audio output to which another dedicated audio output descriptor is applied.

In accordance with an electronic device and a controlling method thereof according to various example embodiments, when a new application is newly installed or an application is executed, the electronic device may generate at least one of a dedicated audio output descriptor or a dedicated audio output thread, which is corresponding to the application.

In accordance with an electronic device and a controlling method thereof according to various example embodiments, the electronic device may provide a user interface for setting an audio setting value included in the dedicated audio output descriptor corresponding to the application.

While the disclosure has been illustrated and described with reference to various example embodiments thereof, it will be understood that the various example embodiments are intended to be illustrative, not limiting. It will be understood by those skilled in the art that various changes in form and details may be made therein without departing from the spirit and scope of the disclosure, including the appended claims and their equivalents.

What is claimed is:

1. A method for controlling an electronic device comprising one or more processors, a foldable display, and memory, the method performed by the electronic device comprising:
   executing a first application on a first area of the foldable display;
   executing a second application, concurrently with the first application, on a second area of the foldable display, the second area being distinguished from the first area at least by a folding area of the foldable display;
   generating a first dedicated audio output descriptor and a first dedicated audio output thread corresponding to the first application in response to the execution of the first application;
   generating a second dedicated audio output descriptor and a second dedicated audio output thread corresponding to the second application in response to the execution of the second application;
   applying a first audio setting value stored in the first dedicated audio output descriptor to first audio data associated with the first application using the dedicated audio output thread; and
   applying a second audio setting value stored in the second dedicated audio output descriptor to second audio data associated with the second application using the second dedicated audio output thread, the second audio setting value including information indicating an audio output path different from the first audio setting value.

2. The method of claim 1, further comprising:
obtaining an audio policy to be applied to the first application from the first application to generate the dedicated first audio output descriptor.

3. The method of claim 1, further comprising:
deleting at least one of the first dedicated audio output descriptor or the first dedicated audio output thread in response to execution termination of the first application or deletion of the first application.

4. The method of claim 2, further comprising:
providing an audio policy input user interface including an object for adjusting the first audio setting value in response to an external input requesting execution of a function of setting the audio policy for the first application.

5. The method of claim 4, further comprising:
adjusting the first audio setting value of the first dedicated audio output descriptor using the first audio setting value received through the audio policy input user interface.

6. An electronic device comprising:
a foldable display including a first area and a second area being distinguished form the first area by at least a folding area;
at least one or more processors; and
at least one or more memories,
wherein the memories store instructions that, when executed, cause the at least one or more processors to:
execute a first application on the first area of the foldable display;
execute a second application, concurrently with the first application, on the second area of the foldable display;
generate a first dedicated audio output descriptor corresponding to the first application and a first dedicated audio output thread corresponding to the first application in response to the execution of the first application;
generate a second dedicated audio output descriptor and a second dedicated audio output thread corresponding to the second application in response to the execution of the second application;
apply a first audio setting value stored in the first dedicated audio output descriptor to first audio data associated with the first application using the first dedicated audio output thread; and
apply a second audio setting value stored in the second dedicated audio output descriptor to second audio data associated with the second application using the second dedicated audio output thread, the second audio setting value including information indicating an audio output path different from the first audio setting value.

7. The electronic device of claim 6, wherein the instructions, when executed, cause the at least one or more processors to:
obtain an audio policy to be applied to the first application from the first application to generate the first dedicated audio output descriptor.

8. The electronic device of claim 6, wherein the instructions, when executed, cause the at least one or more processors to:
delete at least one of the first dedicated audio output descriptor or the first dedicated audio output thread in response to execution termination of the first application or deletion of the first application.

9. The electronic device of claim 7, wherein the instructions, when executed, cause the at least one or more processors to:
provide an audio policy input user interface including an object for adjusting the first audio setting value in response to an external input requesting execution of a function of setting the audio policy for the first application.

10. The electronic device of claim 9, wherein the instructions, when executed, cause the at least one or more processors to:
adjust the first audio setting value of the first dedicated audio output descriptor using the first audio setting value received through the audio policy input user interface.

* * * * *